US009854158B2

United States Patent
Okada et al.

(10) Patent No.: US 9,854,158 B2
(45) Date of Patent: Dec. 26, 2017

(54) IMAGE ADJUSTING APPARATUS

(71) Applicant: OLYMPUS CORPORATION, Hachioji-shi, Tokyo (JP)

(72) Inventors: Keiji Okada, Tokyo (JP); Sachie Yamamoto, Tokyo (JP); Satoshi Miyazaki, Tokyo (JP); Takeshi Kawawa, Tokyo (JP); Naoki Fujii, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 15/334,476

(22) Filed: Oct. 26, 2016

(65) Prior Publication Data

US 2017/0126961 A1    May 4, 2017

(30) Foreign Application Priority Data

Nov. 2, 2015  (JP) ................................. 2015-215465
Nov. 2, 2015  (JP) ................................. 2015-215467

(51) Int. Cl.
*H04N 5/232*  (2006.01)
*H04N 9/04*  (2006.01)
(Continued)

(52) U.S. Cl.
CPC ......... *H04N 5/23216* (2013.01); *H04N 5/232* (2013.01); *H04N 5/23293* (2013.01);
(Continued)

(58) Field of Classification Search
CPC ............... H04N 5/23216; H04N 5/232; H04N 5/23293; H04N 9/045; H04N 9/64
See application file for complete search history.

(56) References Cited

U.S. PATENT DOCUMENTS

2012/0081566 A1*  4/2012  Cote .................... H04N 5/2256
                                                         348/222.1
2013/0321675 A1*  12/2013  Cote ....................... H04N 9/64
                                                         348/242
(Continued)

FOREIGN PATENT DOCUMENTS

JP        10-233934          9/1998
JP        2000-050091        2/2000
(Continued)

OTHER PUBLICATIONS

Notice of Rejection Ground for Japanese Patent Application No. 2015-215465, dated Dec. 20, 2016 (6pgs.), with translation (8pgs.).
(Continued)

*Primary Examiner* — Tuan Ho
(74) *Attorney, Agent, or Firm* — John C. Pokotylo; Pokotylo Patent Services

(57) ABSTRACT

A display control unit 110 that displays an image adjustment window in which saturation of a specified hue is set by a two-dimensional coordinate in which a hue is made to correspond to an angular direction and levels of saturation of respective hues are made to correspond to distances in a radial direction and a CPU 140 that specifies the hue through first manipulation input, and sets saturation of the specified hue through second manipulation input are included, and the display control unit displays a polygon representing a relative relationship between levels of saturation of respective hues set by the CPU in the image adjustment window.

20 Claims, 32 Drawing Sheets

(51) Int. Cl.
*H04N 9/64* (2006.01)
*H04N 9/68* (2006.01)

(52) U.S. Cl.
CPC ............... *H04N 9/045* (2013.01); *H04N 9/64* (2013.01); *H04N 9/643* (2013.01); *H04N 9/68* (2013.01)

(56) References Cited

U.S. PATENT DOCUMENTS

2013/0322745 A1* 12/2013 Lim .................. H04N 9/73
  382/162
2014/0176773 A1   6/2014 Sakuma et al.

FOREIGN PATENT DOCUMENTS

| JP | 2006-121421 | 5/2006 |
| JP | 2006-332908 | 12/2006 |
| JP | 2007-228189 | 9/2007 |
| JP | 2008-306305 | 12/2008 |
| JP | 2014-127722 | 7/2014 |

OTHER PUBLICATIONS

Notice of Decision of Patent Grant for Japanese Patent Application No. 2015-215465, dated Apr. 4, 2017 (3 pgs.).

* cited by examiner

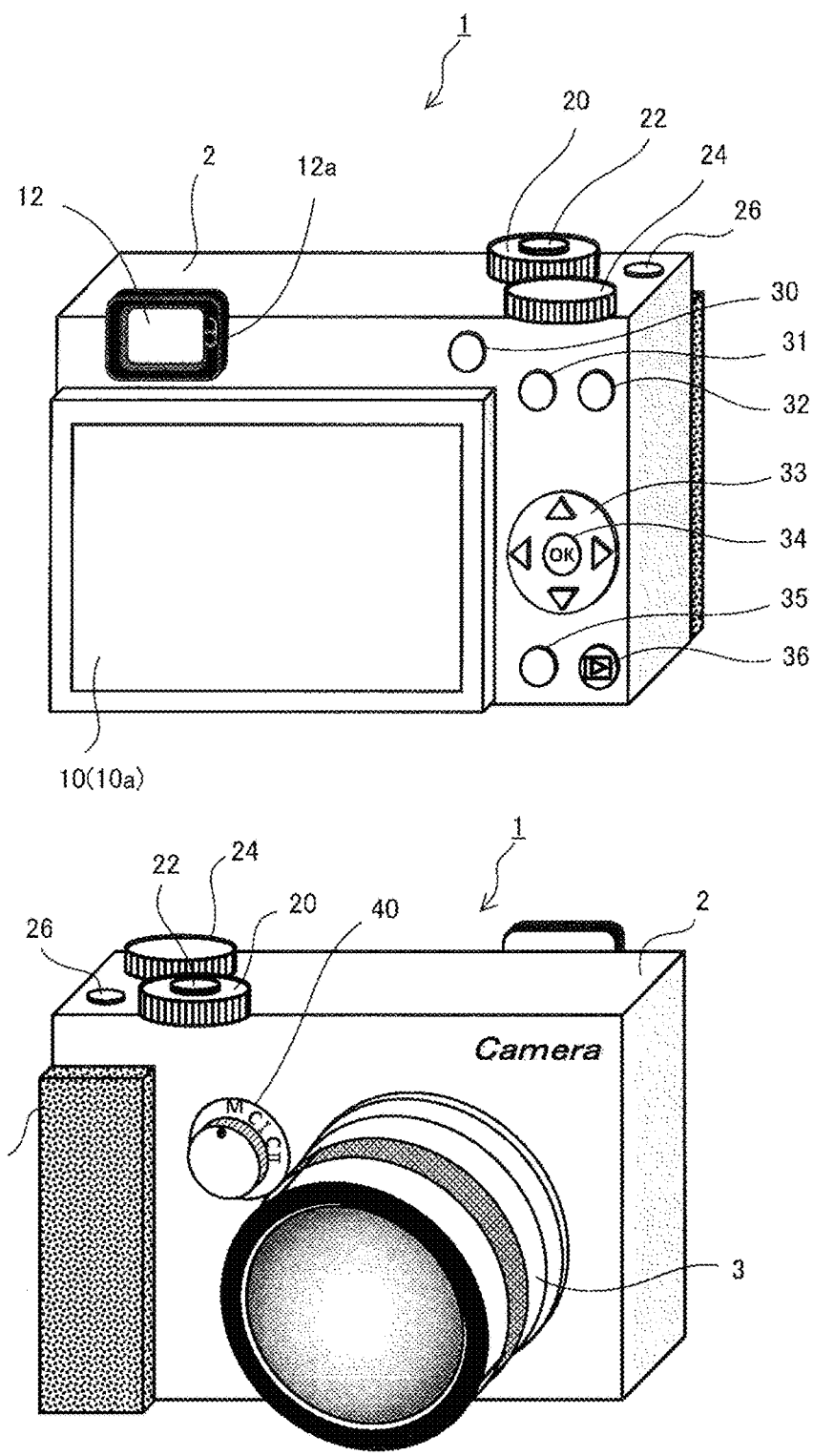
F I G. 1

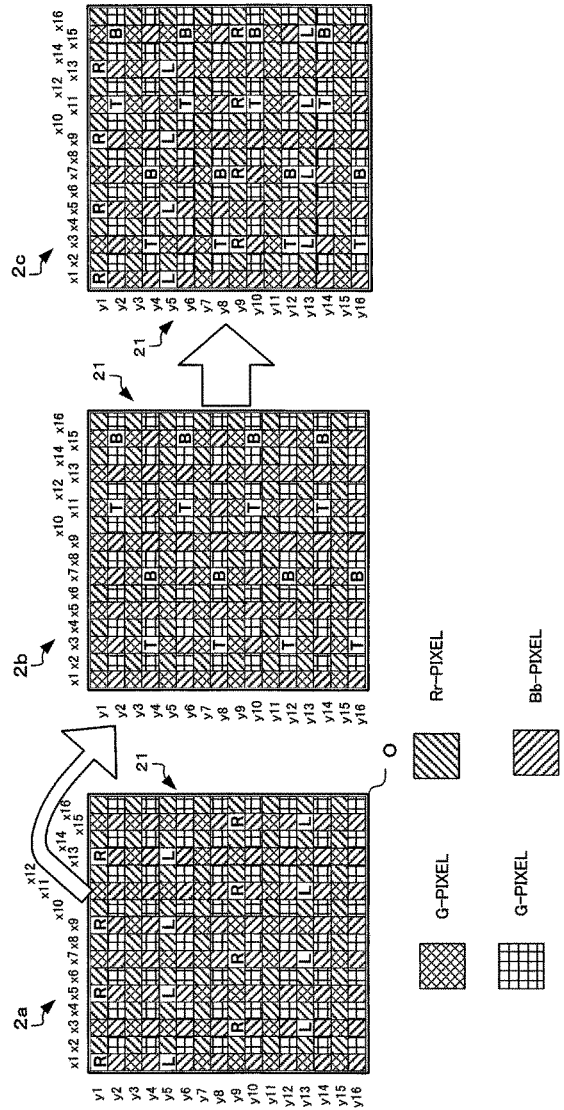

FIG. 3
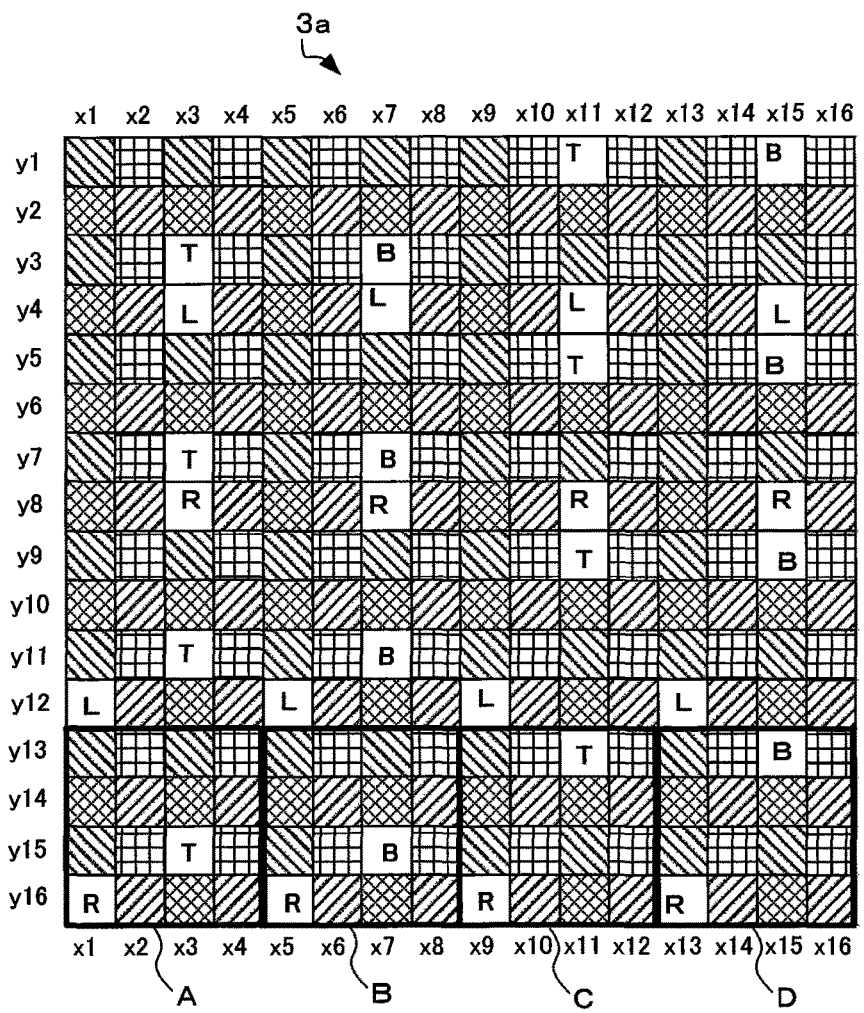
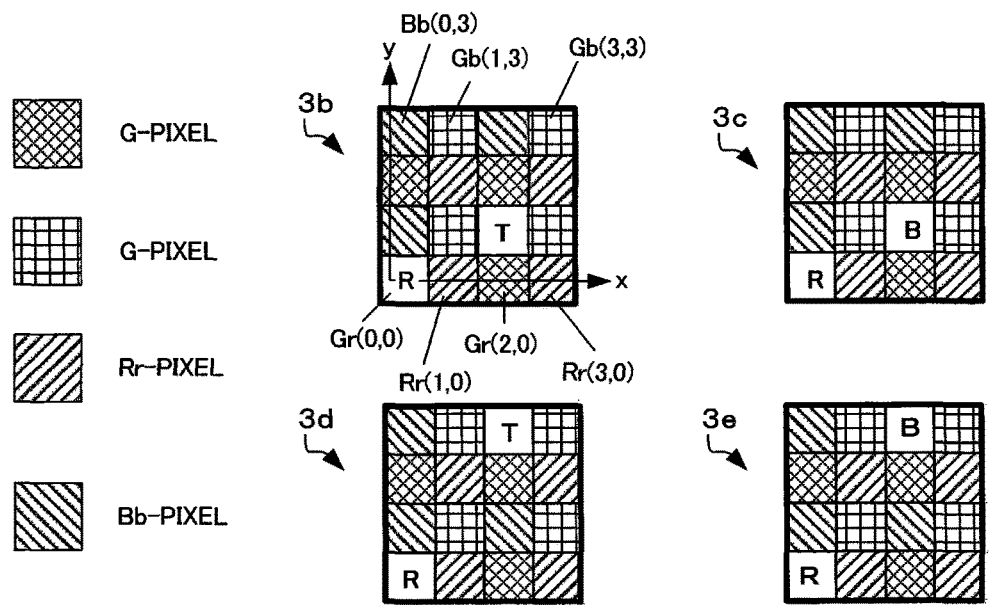

FIG. 4B
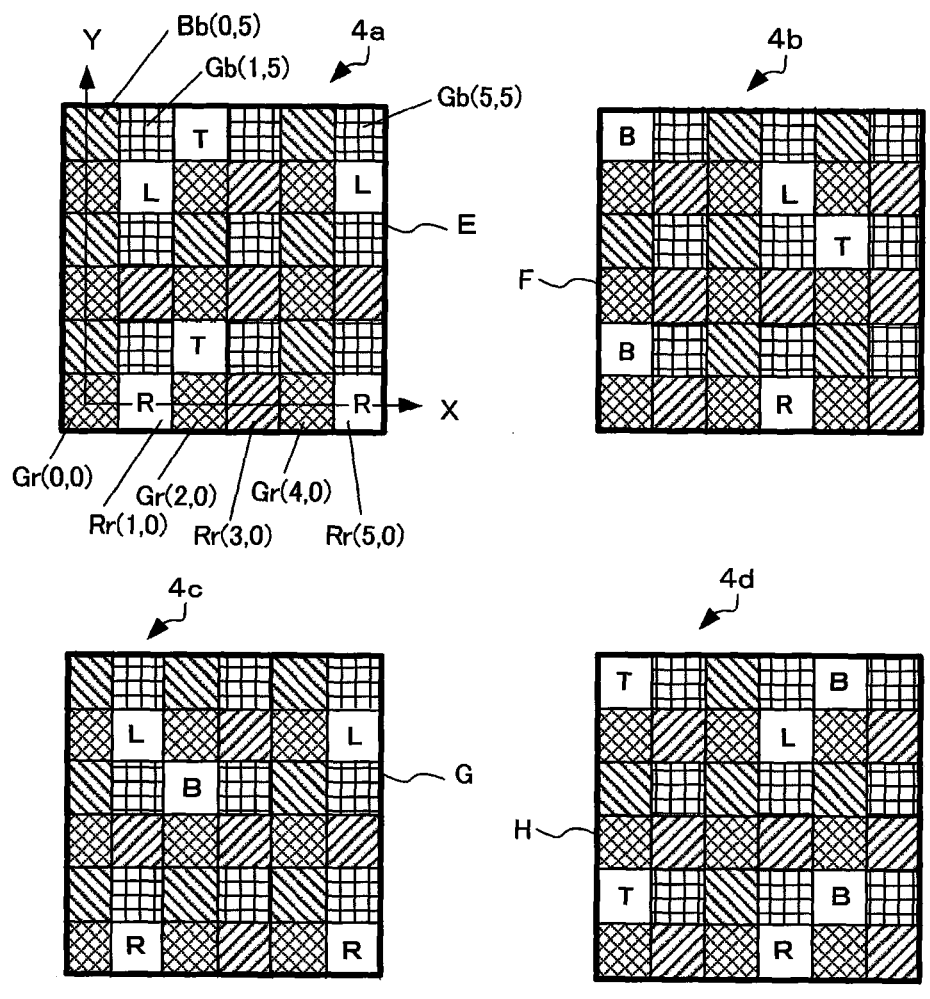
 G-PIXEL  Rr-PIXEL
 G-PIXEL  Bb-PIXEL

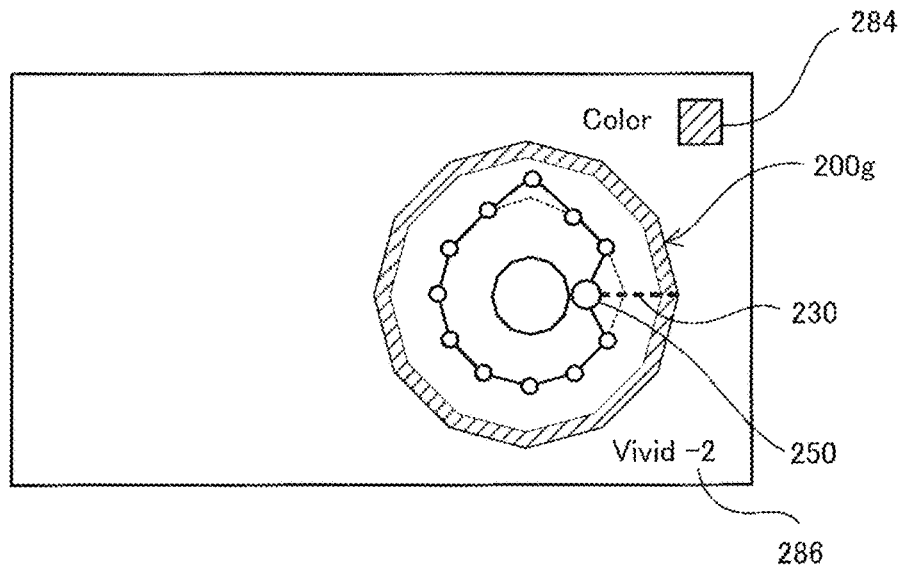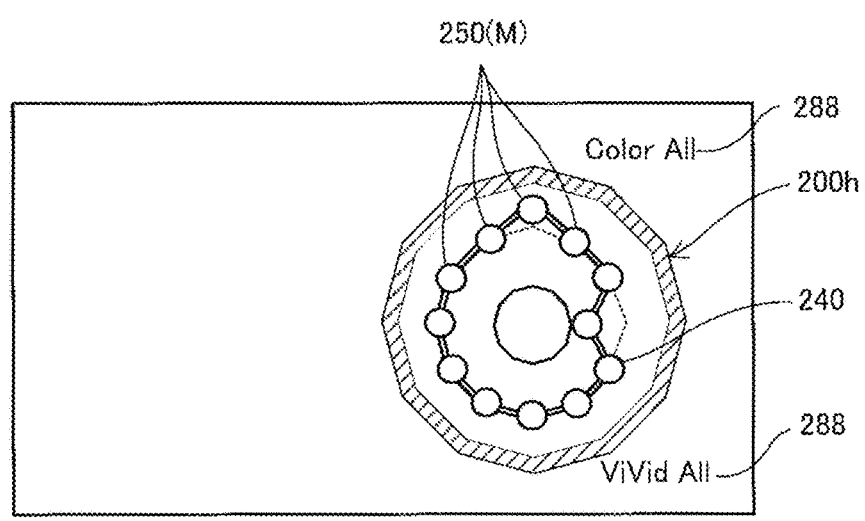
F I G. 9

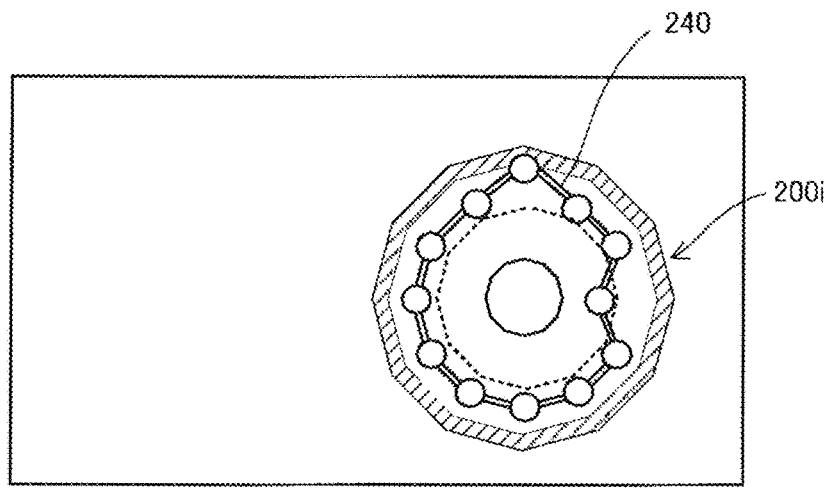
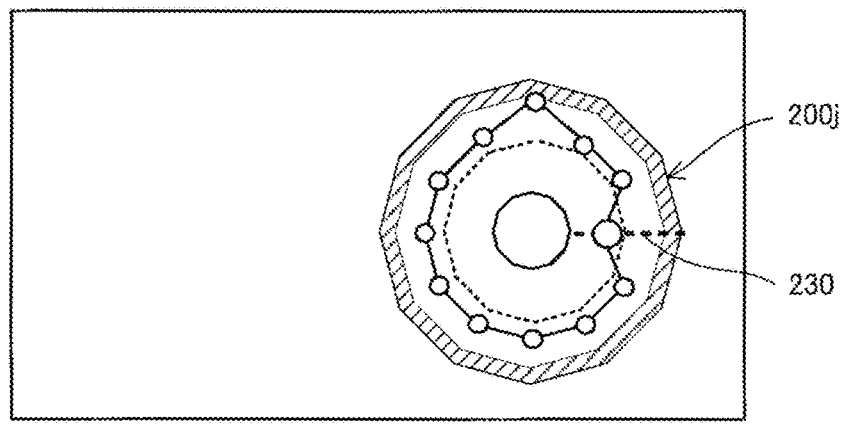
F I G. 10

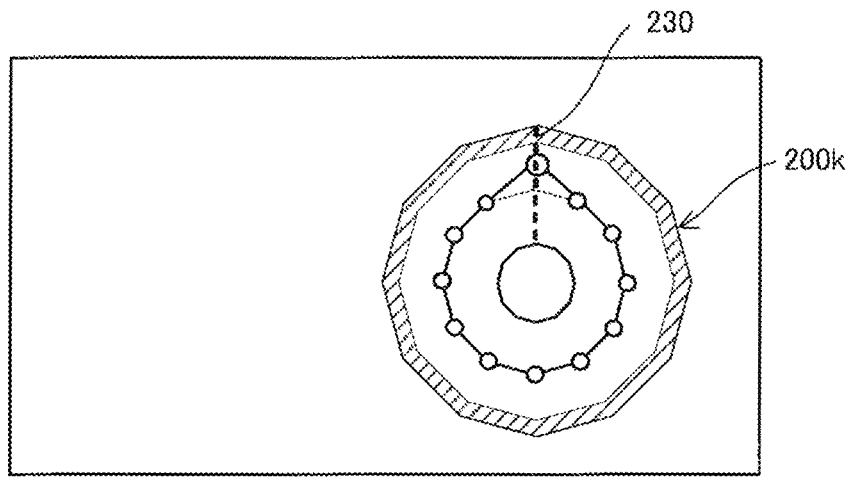
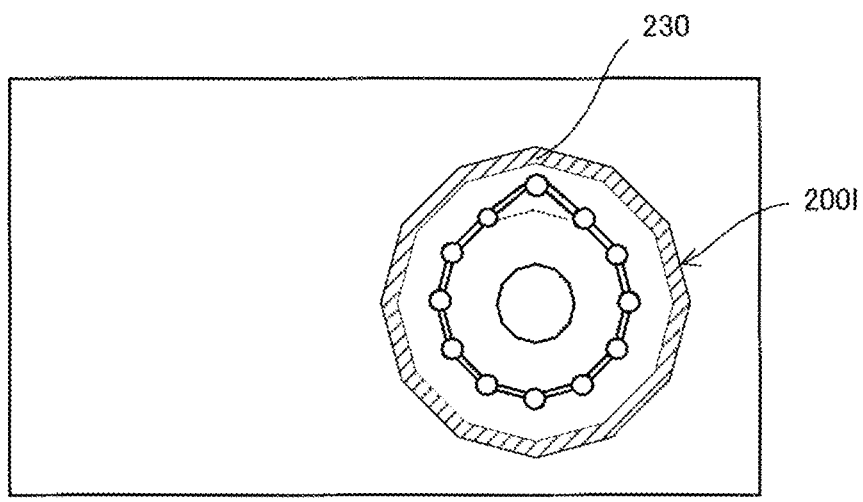
F I G. 11

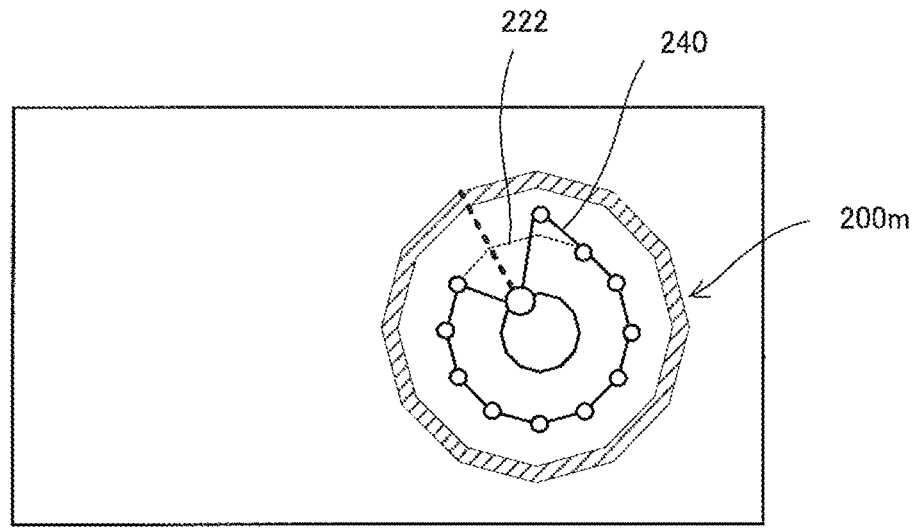
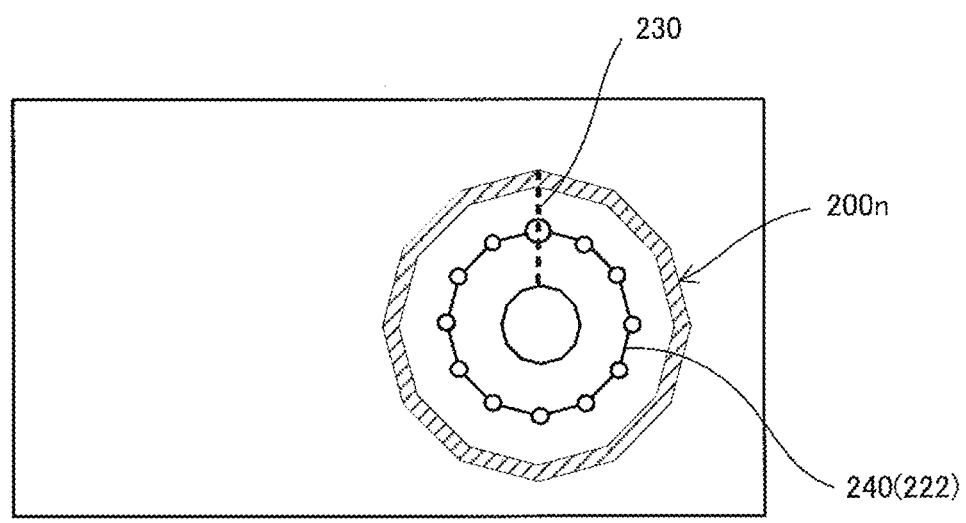
FIG. 13

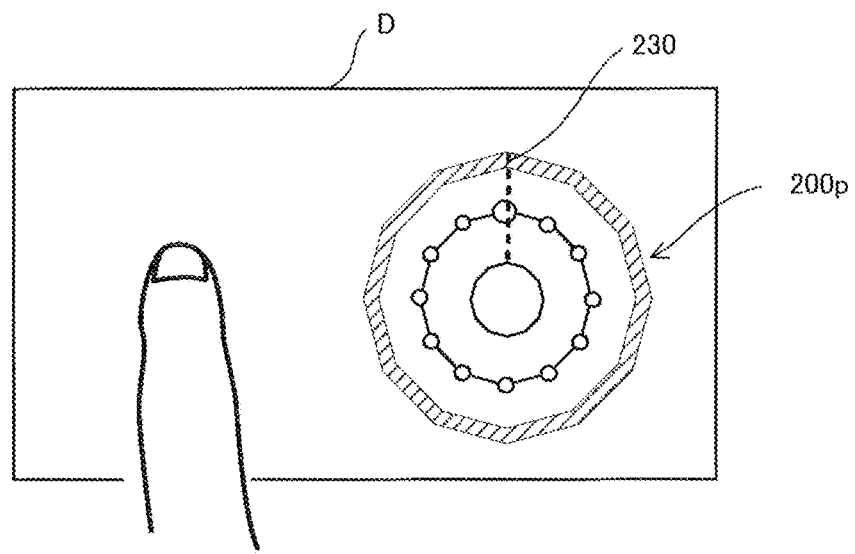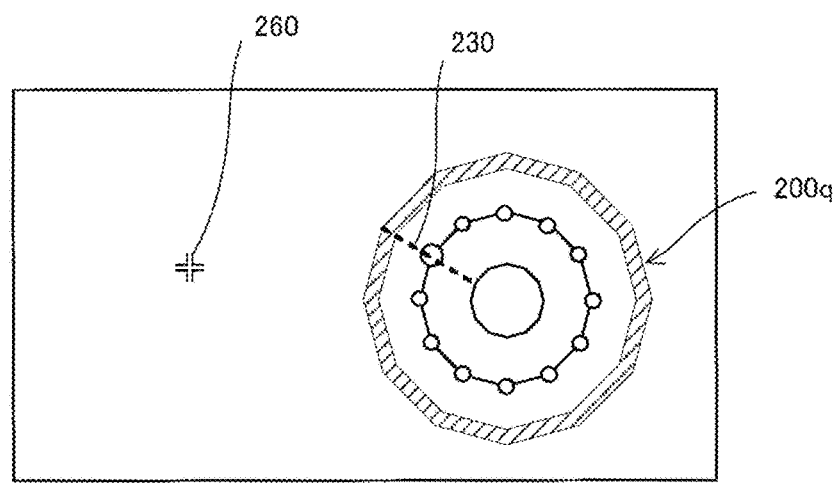
FIG. 14

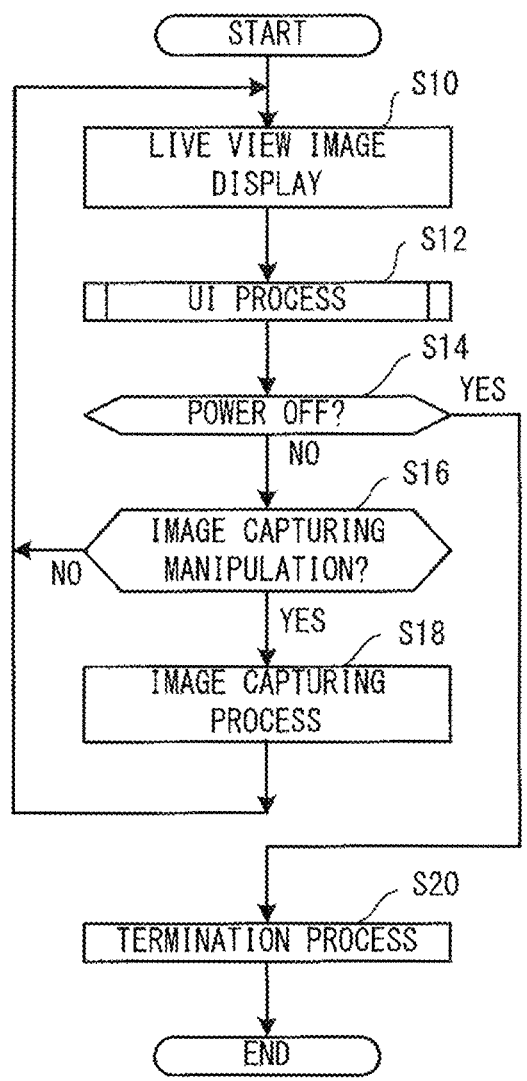
F I G. 2 1

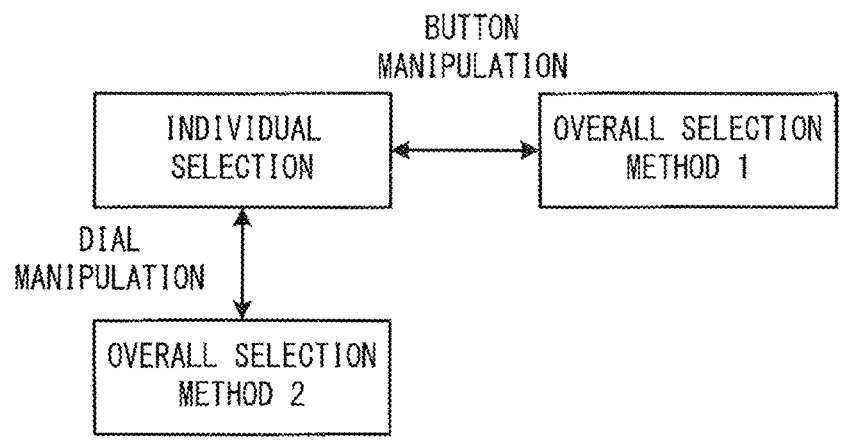
F I G. 24

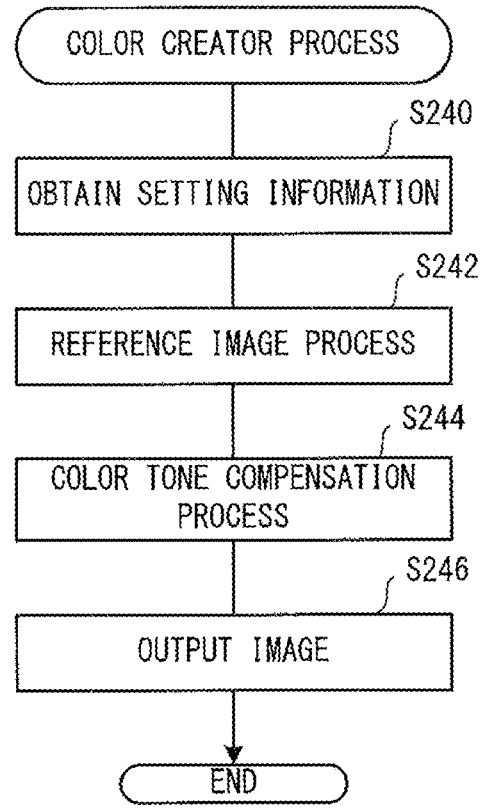
F I G. 3 1

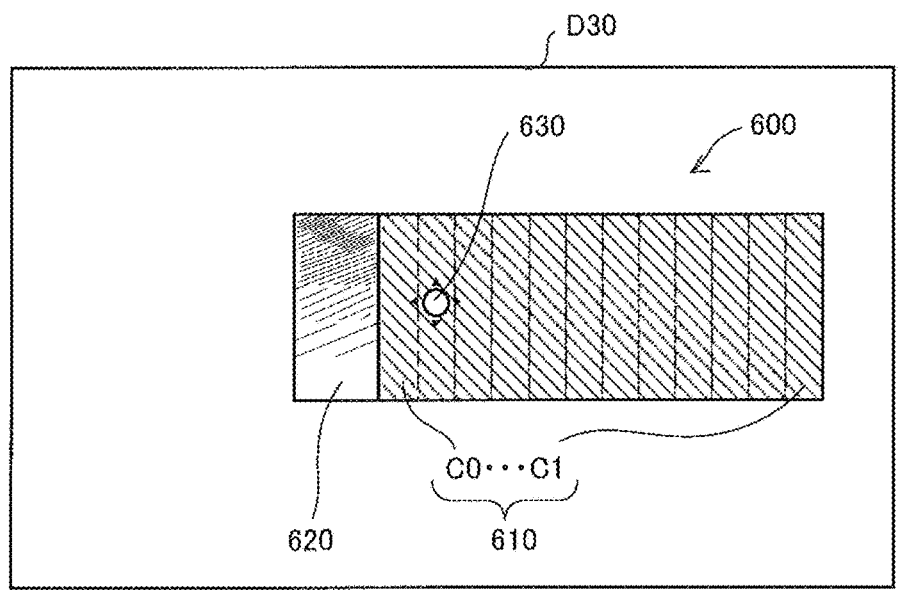
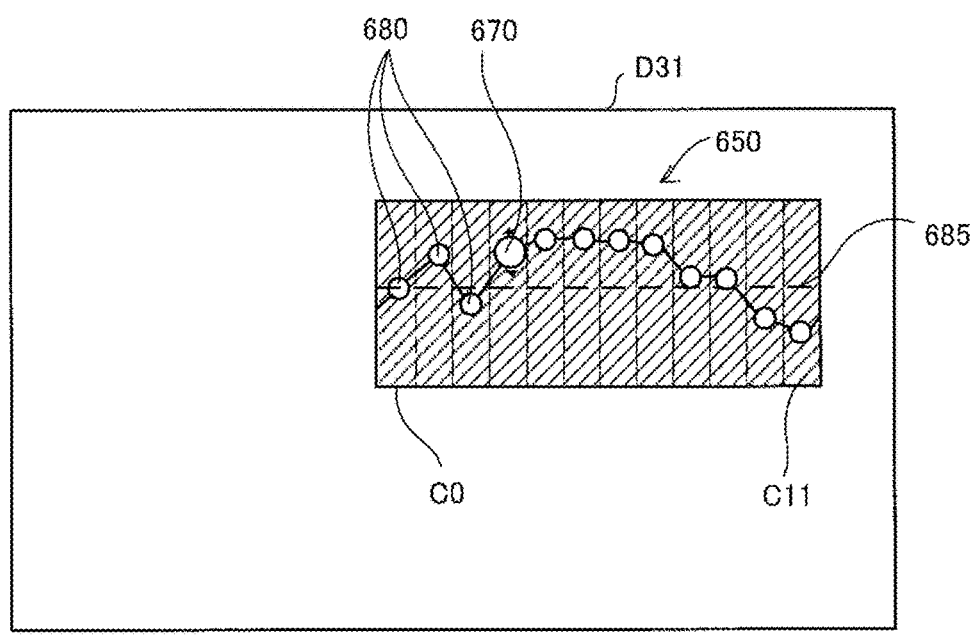
F I G. 3 2

IMAGE ADJUSTING APPARATUS

CROSS-REFERENCE TO RELATED APPLICATIONS

This application is based upon and claims the benefit of priority of the prior Japanese Patent Application No. 2015-215465, filed on Nov. 2, 2015, and No. 2015-215467, filed on Nov. 2, 2015, the entire contents of which are incorporated herein by reference.

BACKGROUND OF THE INVENTION

Field of the Invention

The present invention is related to an image adjusting apparatus for displaying an image adjustment window.

Description of the Related Art

Generally, images are adjusted by using software for image adjustment on a personal computer etc., after the images are captured. However, if images can be recorded with quality that is satisfactory in view of the intention and preference of the user upon the capturing, it not only eliminates the necessity of purchasing dedicated image processing software but also saves the labor of adjusting the images after the capturing. Accordingly, development is being actively carried out for image adjustment functions for an image capturing apparatus. For example, an image capturing apparatus that can easily adjust two image-quality parameters is proposed (Patent Document 1).

[Patent Document 1] Japanese Laid-open Patent Publication No. 2014-127722

SUMMARY OF THE INVENTION

An image adjusting apparatus that sets saturation of a specified hue for a target image includes: a display control unit that displays an image adjustment window in which saturation of a specified hue is set by a two-dimensional coordinate in which a hue is made to correspond to an angular direction and levels of saturation of respective hues are made to correspond to distances in a radial direction; and a control process unit that specifies the hue through first manipulation input, and sets saturation of the specified hue through second manipulation input, and the display control unit displays a polygon representing a relative relationship between levels of saturation of respective hues set by the control process unit in the image adjustment window.

BRIEF DESCRIPTION OF THE DRAWINGS

FIG. 1 shows the appearance of an image capturing apparatus 1 according to the present embodiment;

FIG. 2 is an overall block diagram of the image capturing apparatus 1;

FIG. 3 is a block diagram of part of the entire block diagram of FIG. 2;

FIG. 9 shows an overall selection window based on overall selection method 1 in the multicolor mode;

FIG. 10 explains transitions of an image adjustment window based on overall selection method 1 in the multicolor mode;

FIG. 11 is an overall selection window based on overall selection method 2 in the multicolor mode;

FIG. 13 is an image adjustment window showing a resetting manipulation in the multicolor mode;

FIG. 14 is an example of specifying a hue through a touch panel in the multicolor mode;

FIG. 21 is a flowchart for explaining the procedures of the entire image capturing apparatus;

FIG. 24 shows relationships between individual selection, overall selection method 1 and overall selection method 2;

FIG. 31 is a flowchart showing the procedures of a color creator process; and

FIG. 32 shows an image adjustment window in which hues and saturation are expressed by axes of X and Y that are orthogonal to each other.

DETAILED DESCRIPTION OF THE PREFERRED EMBODIMENTS

Figure 4:
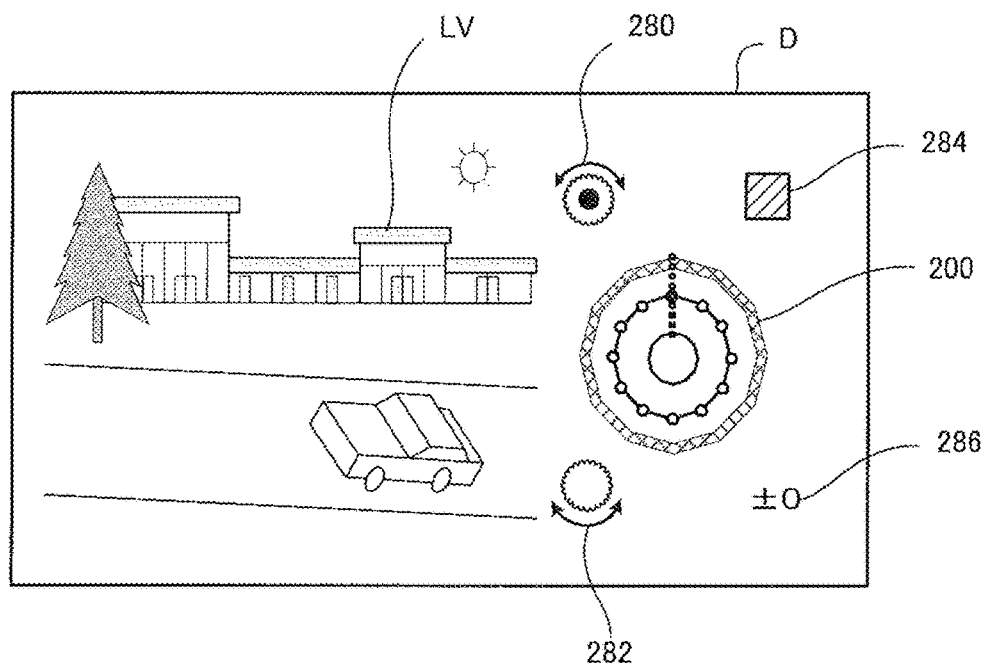
FIG. 4 is an example of an image adjustment window displayed on a live view image in a superimposed manner in the multicolor mode.

Hereinafter, explanations will be given for the embodiments of the present invention by referring to the drawings. FIG. 1 shows the appearance of an image capturing apparatus 1 according to the present embodiment. The upper view in FIG. 1 is a back view of the image capturing apparatus 1. The lower view in FIG. 1 is a front view of the image capturing apparatus 1. The image capturing apparatus 1 includes a main body 2 and a lens unit 3 that is detachable from the main body 2.

A back-surface monitor 10 provided, occupying a large area of the back surface of the main body 2. The back-surface monitor 10 is an image display device that displays captured images, reproduced images, a menu window for setting conditions for the image capturing apparatus 1, etc. The back-surface monitor 10 is implemented by an LCD, an organic EL, or the like. The back-surface monitor 10 is provided with a touch panel 10a in an integrated manner.

In the upper left portion on the back surface of the main body 2, an electronic view finder 12 is provided. The electronic view finder 12 is look-in image display device, and has a small LCD or an organic EL inside. Also, an eye sensor 12a is provided on the right side of the frame of the electronic view finder 12. An eye sensor 12a is an optical sensor for detecting whether or not the image capturing person is looking in the electronic view finder 12.

On the top surface of the main body 2, a front dial 20, a shutter button 22, a rear dial 24 and a power button 26 are provided. The front dial 20 and the rear dial 24 are dial-type manipulation member used for setting various image capturing parameters, etc. Also, the front dial 20 and the rear dial 24 function as manipulation members used for specifying the hues and setting the saturation in an image adjustment window that is for conducting the color adjustment of images, which will be described later. In an image adjustment window, the front dial 20 is also referred to as a first dial and the rear dial 24 is also referred to as a second dial.

The shutter button 22 is a button for inputting an image capturing instructions. For example, the shutter button 22 has two steps, the first step for giving instructions regarding processes of AF, AE, etc., the second step for giving instructions to capture images. The power button 26 is a button for giving instructions to turn on/off the power of the image capturing apparatus 1.

On the back surface of the main body 2, a PICT button 30, a mode button 31, an INFO (information) button 32, an XY direction button 33, an OK button 34, a menu button 35 and a play button 36 are provided.

The PICT button 30 is a button for calling a setting UI (user interface). A picture mode is a mode for image adjustment processes, and the multicolor mode, the color creator mode and the monochrome creator mode, which will be described later, are provided. The mode button 31 is a button for switching the operation modes of the image capturing apparatus 1 such as an image capturing mode etc. The INFO button 32 is a button for calling the information display window. In the multicolor mode, which is one of the picture modes, the INFO button 32 functions also as a button for switching between the individual selection and overall selection.

The XY direction button 33 includes four buttons, and is a button that moves the cursor vertically and horizontally on the window of the back-surface monitor 10. The OK button 34 is a button for admitting changes in conditions etc. The menu button 35 is a button for calling the menu window. The play button 36 is a button for giving instructions to switch between the image capturing mode and the reproduction mode. It is also possible to employ a configuration in which the mode is switched to the image capturing mode in response to the shutter button 22 pushed to the first step even during the reproduction mode.

On the front surface of the main body 2, the lens unit 3 is provided. On the left portion of the front surface of the main body 2, a grip 14 is formed. Also, on the left of the lens unit 3 on the front surface of the main body 2, a picture mode dial 40 is provided. The picture mode dial 40 is a dial for switching the picture mode between the three modes. It is also possible to add a normal image capturing mode to the three picture modes so that the picture mode dial 40 switches between the four modes. Also, the front dial 20 and the rear dial 24 may be provided on the back surface in such a manner for example that they surround the XY direction button 33. By then making the dials have the turning directions identical to that of a color disk, which will be described later, more intuitive manipulations can be provided.

FIG. 2 is an overall block diagram of the image capturing apparatus 1. The lens unit 3 forms a subject image on an image pickup plane. The lens unit 3 has an optical-lens group, a lens driving unit for focusing and zooming, a diaphragm, a diaphragm driving unit (not shown), etc. A lens control unit 50 controls the lens driving unit, the diaphragm driving unit, etc. Also, the lens control unit 50 transmits lens information to the main body 2 and also controls a lens in accordance with instructions from the main body 2.

The main body 2 has a shutter unit 60, an image pickup unit 62, a manipulation member 64, a buffer memory 80, a storage memory 82, an external memory 84 and a camera control unit 100.

The shutter unit 60 is for example an electronic-controlled focal plane shutter, and is configured to open and close so as to shut light so that light incident through the lens unit 3 will not reach the image pickup unit 62. The shutter unit 60 is usually open for allowing the live view.

The image pickup unit 62 is a two-dimensional photoelectric elements such as a CCD, CMOS, etc. (not shown), and performs a photoelectric conversion on the subject image formed after being incident through the lens unit 3.

The manipulation member 64 collectively consists the buttons and dials explained in FIG. 1, and includes the front dial 20, the shutter button 22, the rear dial 24, the power button 26, the PICT button 30, the mode button 31, the INFO button 32, the XY direction button 33, the OK button 34, the menu button 35, the play button 36 and the picture mode dial 40.

The buffer memory 80 is used as an image process computation area or an area for conducting display or for temporarily holding external memory data. The storage memory 82 is a rewritable non-volatile memory, and is for example a flash memory. In the storage memory 82, a control program for controlling the image capturing apparatus 1, various setting etc. of the image capturing apparatus 1 and graphic data for an image adjustment window are stored. The external memory 84 is for example a non-volatile flash memory that can be removed from the main body 2, and stores image data that was picked up.

The camera control unit 100 is a control unit that collectively controls the entire image capturing apparatus 1. The camera control unit 100 includes an image-pickup control unit 102, a shutter control unit 104, a lens communication unit 106, an external memory control unit 108, a display control unit 110, an image process unit 120, a manipulation input unit 130 and a CPU 140.

The image-pickup control unit 102 controls the image pickup unit 62 and also converts an image signal output from the image pickup unit 62 into digital image data. The shutter control unit 104 controls the opening and closing of the shutter unit 60. The lens communication unit 106 performs a communication with the lens unit 3 so as to transmit movement information of focus and zoom position information to the lens unit 3, and receives lens information and state information from the lens unit 3.

The external memory control unit 108 controls the reading and writing of image data from and to the external memory 84. The display control unit 110 controls the back-surface monitor 10 and the electronic view finder 12 so as to display the live view image, a captured image, and an OSD (on screen display) in the back-surface monitor 10 and the electronic view finder 12. The display control unit 110 generates and displays an image adjustment window as an OSD in accordance with a manipulation to the manipulation input unit 130. Note that because the back-surface monitor 10 and the electronic view finder 12 are display units that are in the same category, they are collectively referred to as a display unit 90 when it is not necessary to discriminate between them.

The image process unit 120 performs various processes such as an interpolation process, a WB (white balance) process, etc. on image data output from the image-pickup control unit 102 so as to generate live view image LV etc. Also, the image process unit 120 performs a JPEG data generation process for storing image data in the external memory 84, and develops image data stored in the external memory 84 so as to convert the data into image data. Further, the image process unit 120 performs various image adjustment processes in accordance with the setting in an image adjustment window in a picture mode.

The manipulation input unit 130 reports, to the CPU 140, an instruction in accordance with the content input to the dials such as the front dial 20 etc., the buttons such as the shutter button 22 etc., and a touch panel 10a. Note that a manipulation input through the front dial 20 is referred to as first manipulation input, and a manipulation input through the rear dial 24 is referred to as second manipulation input.

The CPU 140 controls the entire camera control unit 100 by executing a control program stored in the storage memory 82. Also, in response to a report from the manipulation input unit 130, the CPU 140 specifies a hue in response to a manipulation of the front dial 20, and sets saturation of the specified hue in response to a manipulation of the rear dial 24. Note that the CPU 140 is referred to as a control process unit.

FIG. 3 is part of the entire block diagram of FIG. 2, and shows a result of collecting elements related to an image adjustment process. The image adjustment process is a process of adjusting the saturation and color tones in live view image LV and a reproduced image in accordance with an instruction from the image-capturing person in the above image adjustment window. The image adjustment process is performed mainly by the display control unit 110, the image process unit 120, the manipulation input unit 130 and the CPU 140.

As described above, three modes of the multicolor mode, the color creator mode and the monochrome creator mode are provided as image adjustment processes.

The display control unit 110 generates an image adjustment window in accordance with a selected mode, and superimposes the generated image adjustment window on the live view image etc. so as to display them in the display unit 90 (the back-surface monitor 10 or the electronic view finder 12). Also, when an instruction from the image capturing person is input to the manipulation input unit 130 through the image adjustment window, the display control unit 110 updates the image adjustment window in accordance with the instruction content, and makes the display unit 90 display the image, generated by the image process unit 120, in which the saturation etc. has been changed.

The display control unit 110 has a color map generation unit 112, a color disk generation unit 114 and a monochrome disk generation unit 116 as functions for generating an image adjustment window.

The color map generation unit 112 generates a color map, which is an image adjustment window in the multicolor mode, and displays it in the display unit 90. The color map generation unit 112 makes the display unit 90 display a window for setting the saturation of a specified hue by two-dimensional coordinates in which a hue is made to correspond to the angular direction and the saturation of each hue is made to correspond to the distance in a radial direction as a color map. The color map generation unit 112 displays a polygon representing the relative relationships of the levels of saturation of respective hues set by the manipulation input unit 130 in the color map.

The color disk generation unit 114 generates a color disk, which is an image adjustment window in the color creator mode, so as to display it in the display unit 90. The monochrome disk generation unit 116 generates a monochrome disk, which is an image adjustment window in the monochrome creator mode, so as to display it in the display unit 90.

The image process unit 120 has a multicolor process unit 122, a color creator process unit 124 and a monochrome creator process unit 126 as function units for adjusting the saturation and color tones in an image adjustment window.

The multicolor process unit 122 operates in the multicolor mode. The multicolor process unit 122 performs a process of changing the saturation of an image having hues specified in an image adjustment window (color map) to the set saturation in the target image, and generates an image. In the multicolor mode, saturation is not changed for images not having specified hues The color creator process unit 124 operates in the color creator mode. The color creator process unit 124 performs a process of emphasizing an image having received automatic color balance adjustment into a color tone specified by an image adjustment window (color disk). Further, the color creator process unit 124 performs a process of changing the saturation of an image emphasized into a specified hue to the saturation set in an image adjustment window (color disk), and generates an image. In the color creator mode, not only the saturation of an image having a specified hue but also the saturation of the entire image is changed, and that is different from the multicolor mode.

The monochrome creator process unit 126 operates in the monochrome creator mode. The monochrome creator process unit 126 performs a monochrome conversion on the color image having received automatic balance adjustment, the monochrome conversion being based on the specified hue and saturation, and generates a monochrome image. Because a monochrome conversion is performed on an entire color image also in the monochrome creator mode, not only the saturation of an image having a specific hue but also the saturation of the entire image changes.

Note that an apparatus including the display control unit 110, the manipulation input unit 130, the image process unit 120, the CPU 140, etc. is referred to as an image adjusting apparatus.

<Multicolor Mode>

First, explanations will be given for an image adjustment process in the multicolor mode. As described above, in the multicolor mode, a portion having a hue specified in an image is adjust to the set saturation. The saturation of a portion of a hue not specified in an image is not changed.

In the multicolor mode, a color map is displayed as an image adjustment window in order to set the saturation of a specified hue. The color map is a two-dimensional coordinate diagram in which a hue is made to correspond to the angular direction and the saturation of each hue is made to correspond to the distance in a radial direction. By referring to FIG. 4 through FIG. 16, an image adjustment process in the multicolor mode will be explained.

FIG. 4 shows window D of the display unit 90. Window D in FIG. 4 is an example in which an image adjustment window is superimposed on live view image LV. An image adjustment window includes the color map 200 and supplementary marks (280, 282, 284 and 286) located at the four corners of a color map 200.

The supplementary marks are supplementary information for manipulations. The supplementary mark 280 indicates that the front dial 20 is means for adjusting hues. The supplementary mark 282 indicates that the rear dial 24 is means for adjusting saturation. The supplementary mark 284 is represents the same color as the color of the specified hue. The supplementary mark 286 represents the value of specified saturation. "±" indicates that the current setting value of the saturation is a default value.

Figure 5A:
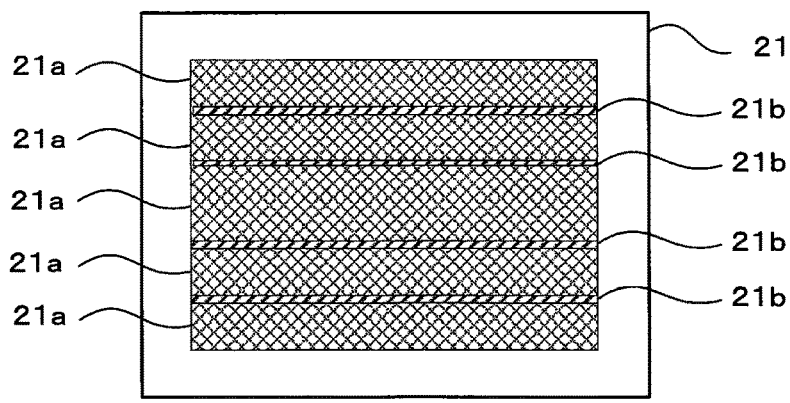
FIG. 5 explains a color map in the multicolor mode.
Figure 5B:
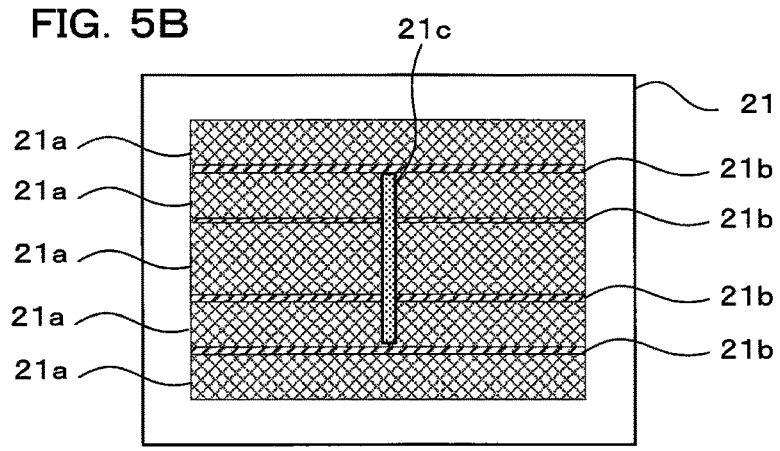

FIG. 5 is an enlarged view of the color map 200. The color map 200 is an example in which twelve steps can be set for a hue. Each hue corresponds to the range of 30 degrees, i.e., "1 hour" on clock. In this example, the range of ±15 degrees around zero o'clock is treated as the hue of yellow". Hereinafter, one o'clock, two o'clock, three o'clock, four o'clock, five o'clock, six o'clock, seven o'clock, eight o'clock, nine o'clock, ten o'clock and eleven o'clock are treated as "yellow orange", "red orange", "red", "red purple", "purple", "blue purple", "blue", "blue containing green", "blue green", "green" and "yellow green". In the following explanations, each hue is referred to as its corresponding time o'clock such as "yellow (zero o'clock), . . . , yellow green (eleven o'clock)" for the sake of convenience. However, each character of "yellow (zero o'clock), . . . , yellow green (eleven o'clock)" does not always have to be expressed in the actual window.

The color map 200 is implemented by a equilateral dodecagon in shape. The ring of the equilateral dodecagon represents a hue ring 210. The sectoral areas at 30-degree intervals of the hue ring 210 are treated as areas C0 through C11 in the clock wise direction. Areas C0 through C11 correspond to hues. For example, area C0 corresponds to "yellow", and is expressed in yellow. Area C1 is expressed in "yellow orange". Note that the hue ring 210 may be expressed in such a manner that the color changes continuously instead of stepwisely.

The color map 200 is provided with a control bar 230 for specifying hues. The control bar 230 includes an array of step-number marks 232 for indicating the setting position of saturation. In this example, an example in which the control bar 230 includes eight step-number marks 232 is shown. The step-number marks 232 shows setting values of saturation. In other words, eight steps can be set for saturation. An outermost step-number mark 232a corresponds to the highest value of saturation, and an innermost step-number mark 232b corresponds to the lowest value of saturation. The control bar 230 moves along the hue ring 210 in a running manner.

In FIG. 5, the control bar 230 is in the direction of zero o'clock. The initial position of the control bar 230 is in the direction of zero o'clock. In accordance with the turning of the front dial 20, the control bar 230 is turned. The front dial 20 and the control bar 230 are in the same turning direction, seen from the user.

Inside of the hue ring 210 of the color map 200, color marks M0 through M11 representing the saturation currently selected for each hue are displayed. Color marks M0 through M11 are arranged at the positions of the saturation that is currently set for the respective twelve hues. For example, color mark M0 represents the saturation of yellow (zero o'clock), and color mark M1 represents yellow orange (one o'clock). Twelve color marks M0 through M11 may also be referred to as color marks M in a collective manner.

Also, color marks M0 through M11 are displayed in the colors of their corresponding hues. And, straight lines connect adjacent color marks so as to form for a polygon. The polygon formed by straight lines connecting adjacent color marks M is referred to as a saturation graph 240. The saturation graph 240 represents the saturation balance of the overall hues.

On the control bar 230, a point mark 250 is displayed at the current setting position of the saturation. The point mark 250 is displayed in such a manner that it can be distinguished from the step-number mark 232 and color marks M. For example, the point mark 250 is displayed in a larger size than the step-number marks 232 and color marks M. Also, the point mark 250 is displayed in the color of the corresponding hue.

The point mark 250 reciprocates linearly along the array of the step-number marks 232 in accordance with the turning of the rear dial 24. Hereinafter, it is assumed that the point mark 250 moves in the inward direction so as to set the saturation to be low in response to clockwise turning of the rear dial 24, and the point mark 250 moves in the outward direction so as to set the saturation to be high in response to counter clockwise turning of the rear dial 24.

Also, in the color map 200, a lower limit frame 220, a neutral line 222 and an upper limit frame 224 are displayed in this order from the center. The lower limit frame 220 represents the lower limit (minimum value) that can be set for saturation. The neutral line 222 represents the initial value (default value) of saturation. The upper limit frame 224 represents the upper limit (maximum value) that can be set for saturation. The lower limit frame 220, the upper limit frame 224 and the neutral line 222 are polygons that area similar to each and that shares the center.

Note in FIG. 5 that the levels of saturation are all set to the initial values. Accordingly, all color marks M0 through M11 are on the neutral line 222, and the saturation graph 240 is on the neutral line 222.

Figure 6:
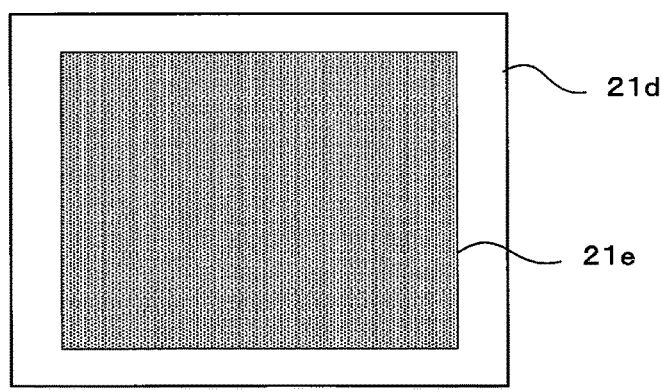
FIG. 6 is an image adjustment window showing saturation setting manipulations in the multicolor mode.

FIG. 6 shows an image adjustment window that shows a manipulation of setting saturation without changing a hue. Note in FIG. 6 and subsequent figures that live view image LV etc. are omitted from the window and only the color map 200 is shown in order to avoid confusion in the explanations. Also, the control bar 230 omits the step-number marks 232 and is represented by a thick dotted line.

A color map 200a shown in FIG. 6 is in a state in which the saturation of yellow (zero o'clock) has been set to be higher than in the color map 200 shown in FIG. 4. It is assumed that the rear dial 24 is turned in the counter clockwise by a prescribed angle in the color map 200 shown in FIG. 4. As shown in 200a, the point mark 250 of the control bar 230 moves by the number of steps that is in accordance with the turning angle of the rear dial 24 in the outward direction with the control bar 230 remaining in the direction of zero o'clock. The color map 200a is an example in which the point mark 250 has moved by two steps. Thereby, the saturation of yellow (zero o'clock) is set to be two steps higher, and saturation of yellow that is two steps higher is displayed in the image. The thin dotted line represents the neutral line 222.

Figure 7:
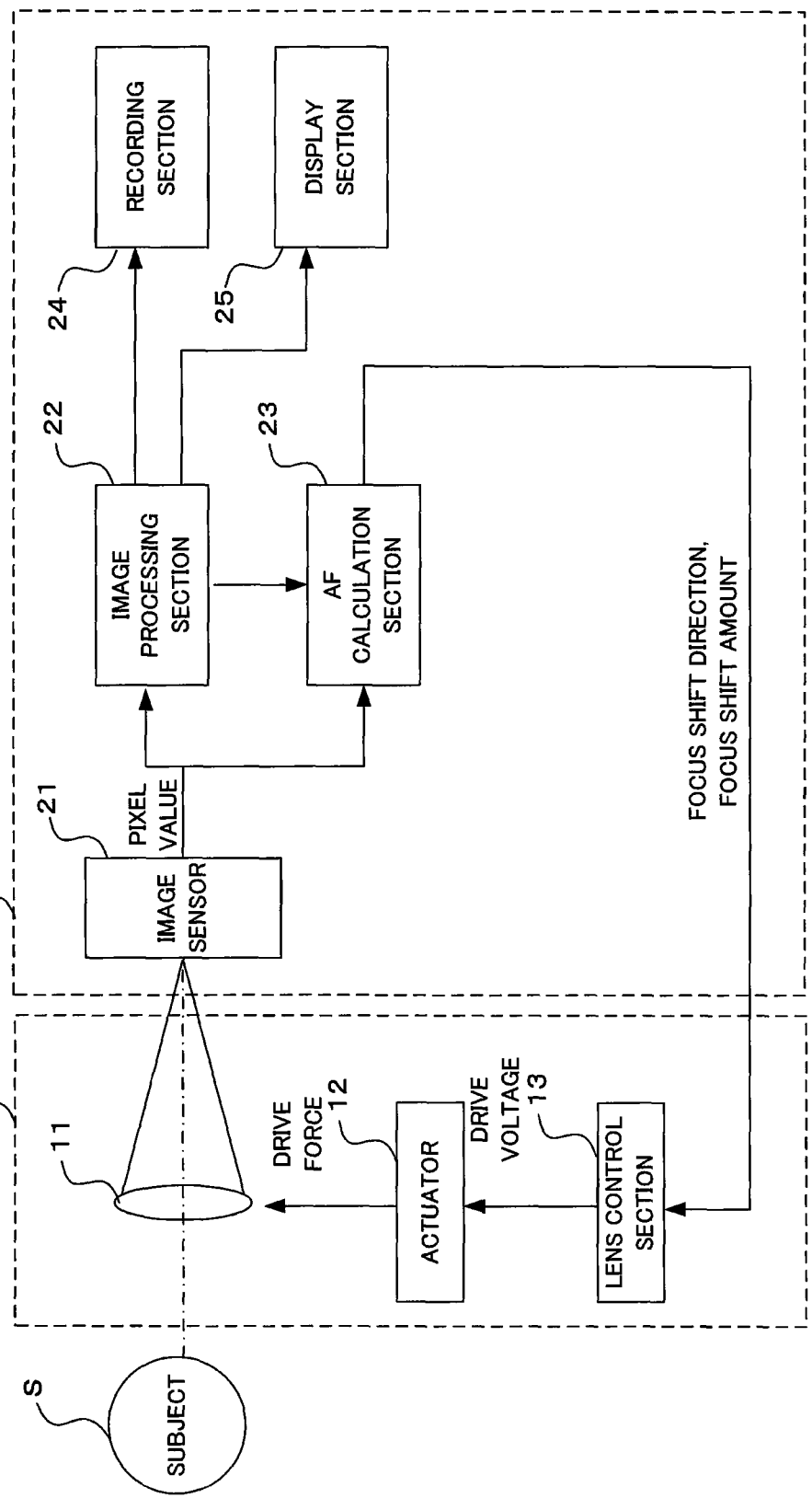
FIG. 7 is an image adjustment window showing saturation setting manipulations for a specified hue in the multicolor mode.

FIG. 7 is an image adjustment window in which a hue is specified and saturation is set in accordance with the specified hue. In response to clockwise turning of the color map 200 in the color map 200a shown in FIG. 6, the control bar 230 turns in the clockwise direction in accordance with the turning angle of the color map 200 as shown in a color map 200b shown in FIG. 7. The color map 200b shows an example in which the control bar 230 has moved to red (three o'clock). Thereby, red is specified as the hue.

Next, when the rear dial 24 is turned in the clockwise direction, the point mark 250 moves by the number of steps that is in accordance with the turning angle of the rear dial 24 in the inward direction (color map 200c). The color map 200c shows an example of a movement by two steps. Thereby, the saturation of red (three o'clock) is set to be two steps lower. In the image, the saturation of red that is two steps lower is displayed.

Figure 8:
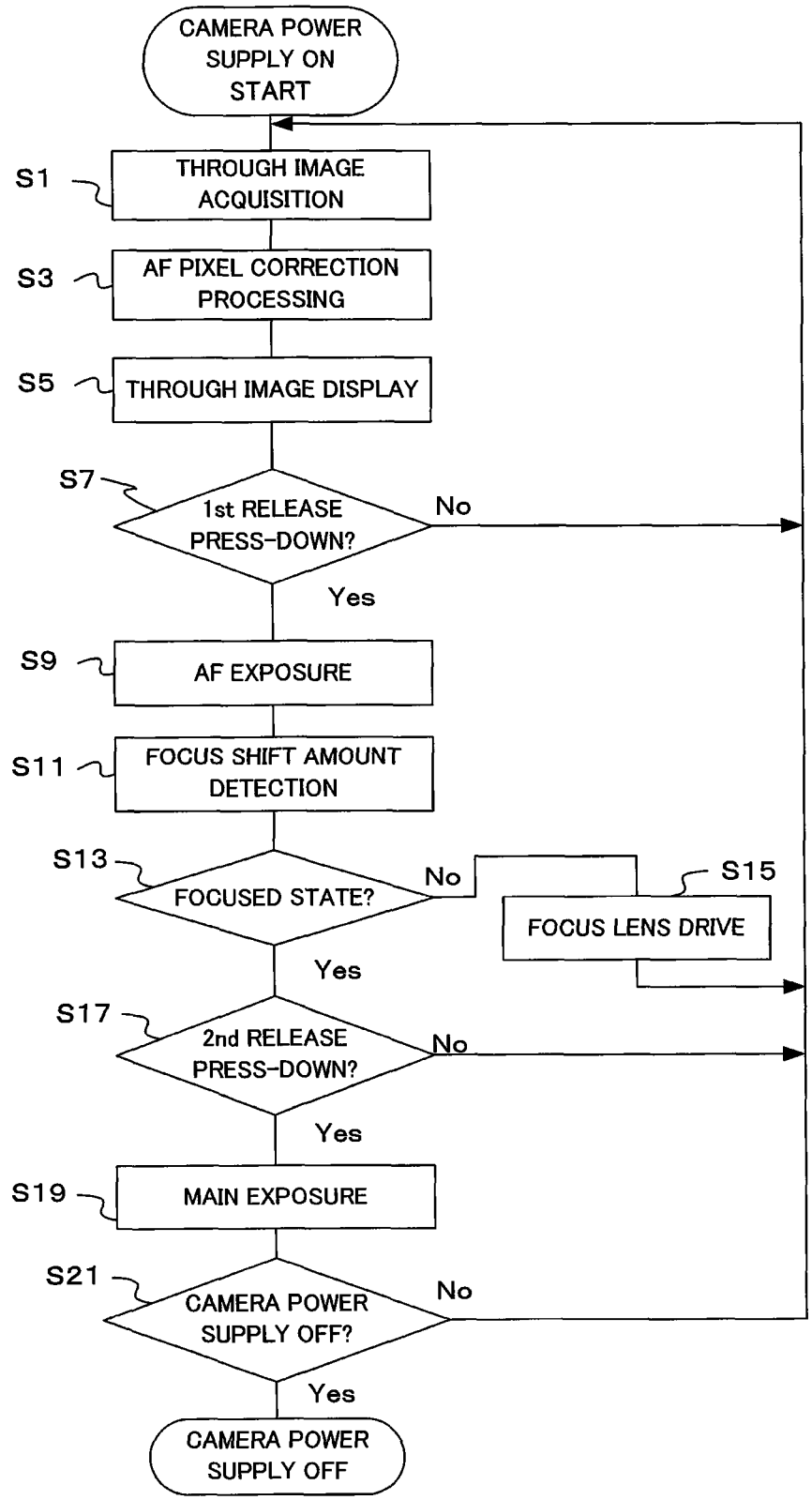
FIG. 8 is an image adjustment window showing a manipulation in which the saturation is stopped at the upper or lower limit in the multicolor mode.

FIG. 8 is an image adjustment window for a case where the saturation is stopped at the upper or lower limit. When the front dial 20 is turned in the counter clockwise direction in the color map 200a shown in FIG. 6, the control bar 230 moves to yellow green (eleven o'clock) as shown in a color map 200d shown in FIG. 8. Next, when the rear dial 24 is turned in the clockwise direction, the point mark 250 moves in the inward direction, but it stops at the lower limit frame 220 (color map 200e). Even when the rear dial 24 is turned in the clockwise direction after stopping, that manipulation is treated as invalid.

Similarly, when the rear dial 24 is turned in the counter clockwise direction in the color map 200a shown in FIG. 6, the point mark 250 moves in the outward direction, but it stops at the upper limit frame 224 and does not move outwardly beyond the upper limit frame 224 (color map 200f).

In FIG. 6 through FIG. 8, a method of adjusting the saturation of each hue has been explained. The method of adjusting the saturation of each hue is referred to as an individual selection. In an image adjustment window in the multicolor mode, saturation of all hues can also be adjusted collectively. The method of collectively adjusting the levels of saturation of all hues is referred to as overall selection.

Also, as methods for switching from an image adjustment window of individual selection to an image adjustment window of overall selection, two methods are prepared; one is a method through pushing a button and the other is a method through moving the control bar 230. The switching method through pushing a button is referred to as overall selection method 1. The switching method through moving the control bar 230 is referred to as overall selection method 2. Examples of overall selection method 1 and overall selection method 2 will be explained below.

FIG. 9 shows an image adjustment window of overall selection based on overall selection method 1. A color map 200g shown in FIG. 9 is an image adjustment window of individual selection. As explained in FIG. 4, the supplementary mark 284 represents the color of the specified hue. Also, the supplementary mark 286 represents the set saturation (−2). When the INFO button 32 is pushed in the color map 200g of individual selection, color map is switched to a color map 200h, which is an image adjustment window of overall selection. Because all color marks M are switched to the point marks 250, color marks Mare displayed in the same size as that of the point marks 250 as shown in the color map 200h.

In the image adjustment window of overall selection, information is displayed for discrimination from individual selection. For example, as shown in the color map 200h, the line constituting the saturation graph 240 is displayed as a double line. Also, a supplementary mark 288 for representing overall selection may be displayed together. Note that the control bar 230 for specifying hues is deleted because it is not necessary in an image adjustment window of overall selection.

FIG. 10 explains transition of an image adjustment window based on overall selection method 1. When the rear dial 24 is turned in the counter clockwise direction in the state of the color map 200h, the saturation of each hue moves in the outward direction by the number of steps in accordance with the turning angle (color map 200i). The color map 200i is an example of movement of two steps, and the saturation of all hues are set to be two steps higher. The saturation graph 240 is enlarged while keeping the saturation balance between hues.

Also, when the INFO button 32 is pushed in the color map 200h, the overall selection is cancelled, it returns to individual selection as shown in a color map 200j, and the control bar 230 is displayed again.

FIG. 11 explains an image adjustment window of overall selection based on overall selection method 2. Overall selection method 2 is a method in which selection is switched from individual selection to overall selection by moving the control bar 230 without using a button. Note that the manipulation of switching between individual selection and overall selection by moving the control bar 230 is referred to also as the third manipulation. In other words, when the third manipulation is conducted, the CPU 140 sets the levels of saturation of all hues through the rear dial 24 on an assumption that all hues are selected.

Specifically, overall selection method 2 is a method in which a switching area is defined in advance for switching between individual selection and overall selection in a range between 0 degree and 360 degrees of the color map 200, the control bar 230 is moved to the switching area, and thereby switching is performed between individual selection and overall selection. Hereinafter, explanations will be given for a manipulation example for a state in which the switching area is set between eleven o'clock and zero o'clock.

When a manipulation is performed to move the control bar 230 in the direction of eleven o'clock through the front dial 20 in a state in which the control bar 230 is at zero o'clock (color map 200k), the selection is switched to overall selection (color map 200l) with the control bar 230 remaining fixed (at zero o'clock). When the rear dial 24 is turned in this state, the saturation of respective hues can be adjusted collectively similarly to overall selection method 1. In overall selection method 2 as well, the control bar 230 is deleted in an image adjustment window, similarly to overall selection method 1.

Also, when the front dial 20 is turned in the counter clockwise direction as if the control bar 230 that is not displayed were moved in the direction of eleven o'clock in the state of the color map 200l, the overall selection is cancelled and it returns to individual selection. Then in the image adjustment window, the control bar 230 is displayed and moves in the direction of eleven o'clock.

Similarly, when the front dial 20 performs a manipulation of moving the control bar 230 in the direction of zero o'clock in a state in which the control bar 230 is positioned at eleven o'clock in the state of individual selection, it is switched to overall selection. When the front dial 20 is turned in the clockwise direction, overall selection is cancelled and it returns to individual selection. In such a case, the control bar 230 is displayed and moves in the direction of zero o'clock.

It is also possible to provide a dedicated vertex for a switching area for overall selection. In other words, it is also possible to change the color map 200 from a dodecagon to a tridodecagon so that the additional vertex is treated as a switching area for overall selection.

Next, explanations will be given for a process performed when the saturation of at least one hue has reached the upper limit in the state of overall selection. As explained in FIG. 8, when saturation has reached the upper or lower limit in individual selection, manipulations performed thereafter are treated as invalid. In overall selection, the two processes explained below can be selected.

In the first process of overall selection, when the saturation of at least one hue has reached the upper limit, even if manipulations are thereafter performed through the rear dial 24 to increase saturation, it is recognized that the saturation is changed in no hues. In other words, also in hues for which saturation has not reached the upper limits, the saturation is not changed. As a matter of course, when a manipulation of decreasing saturation is performed, the levels of saturation of all hues are decreased in accordance with the manipulation.

This also applies to a case when the saturation of one hue has reached the lower limit. In other words, when the saturation of at least one hue has reached the lower limit, saturation is changed in no hues even when a manipulation is thereafter performed through the rear dial 24 to decrease the saturation.

In the second process of overall selection, when the saturation of at least one hue has reached the upper limit, if a manipulation is thereafter performed through the rear dial 24 to of increase the saturation, saturation of hues that have not reached the upper limits is increased in accordance with the manipulation. Similarly, when the saturation of at least one hue has reached the lower limit, if a manipulation is thereafter performed through the rear dial 24 to decrease the saturation, the saturation of hues that have not reached the lower limits is decreased in accordance with the manipulation.

Figure 12:
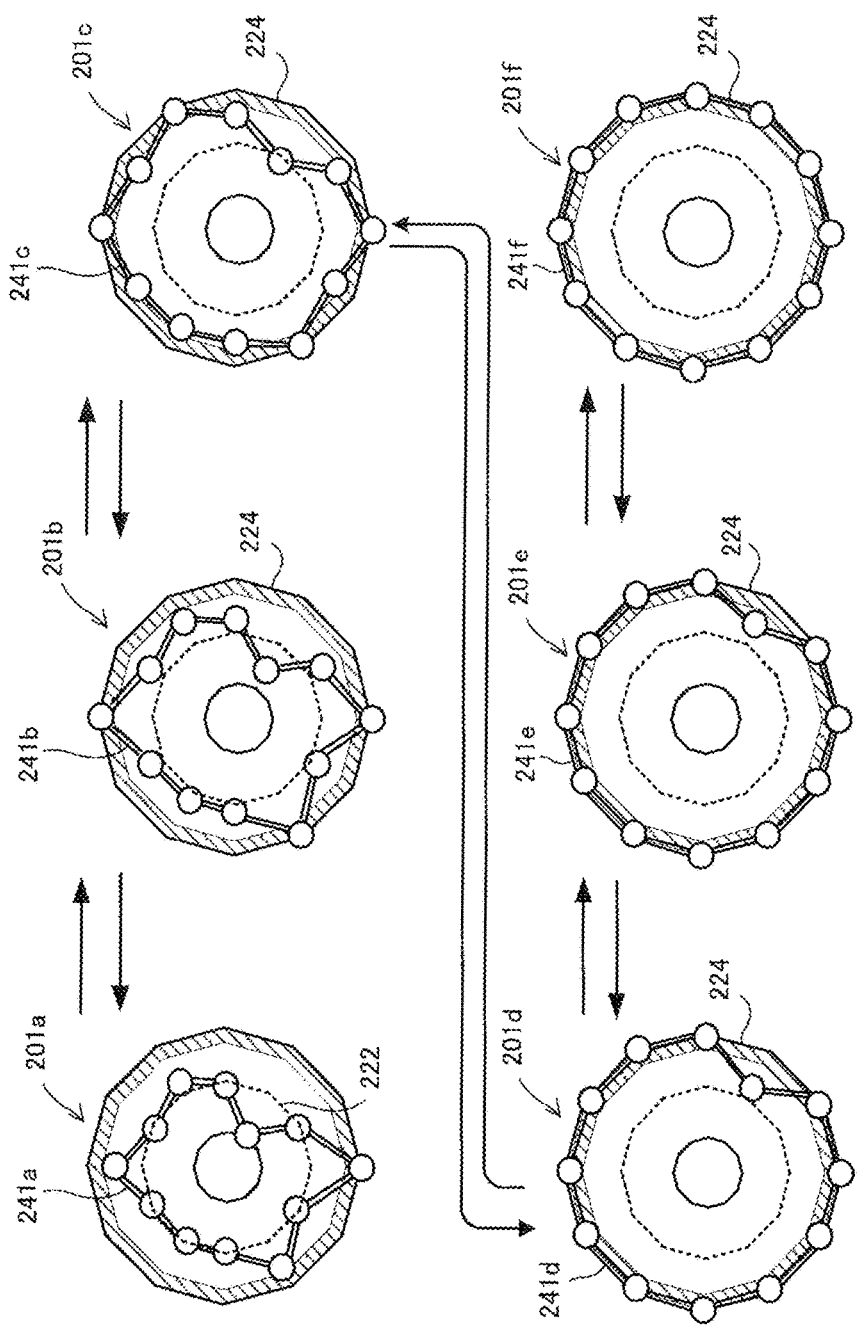
FIG. 12 explains the second process of overall selection in the multicolor mode.

FIG. 12 explains a specific example of the second process of overall selection. In a saturation graph 241a, the saturation of blue purple (six o'clock) has reached the upper limit and red purple (four o'clock) has reached the lower limit (color map 201a). When a manipulation is performed through the rear dial 24 to increase saturation by one step, the saturation of blue purple (six o'clock) is stopped at the upper limit in a saturation graph 241b, and the saturation of other hues increases by one step. Yellow (zero o'clock) and blue containing green (eight o'clock) reach the upper limits (color map 201b).

Further, when a manipulation is performed through the rear dial 24 to increase saturation by one step, the saturation of blue purple (six o'clock) and yellow (zero o'clock) is stopped at the upper limits in the saturation graph 241c, the saturation of other hues increases by one step so that blue (seven o'clock) for example reaches the step that is one step lower than the upper limit (color map 201c).

Further, when a manipulation is performed through the rear dial 24 to increase saturation, only saturation of hues that have not reached the upper limits increases by one step (color map 201d and 201e). When the levels of saturation of all hues have reached the upper limits (saturation graph 241f and color map 201f), manipulations of the rear dial 24 thereafter performed to increase the saturation are treated as invalid.

Next, when a manipulation is performed through the rear dial 24 to decrease saturation in the color map 201f, the saturation is decreased in such a manner that the processes in which the saturation was increased in the color map 201a through color map 201e is performed inversely, instead of the levels of saturation of all hues being decreased. In other words, when a manipulation is performed through the rear dial 24 to decrease saturation, it returns to the state of a saturation graph 241e of the color map 201e from the saturation graph 241f of the color map 201f. Hereinafter, in response to a manipulation performed through the rear dial 24 to decrease by one step, the saturation is decreased in the order of the color map 201e, the color map 201d, the color map 201c, the color map 201b and the color map 201a. This realizes adjustment of the entire saturation in accordance with the intension of the manipulating person.

Next, explanations will be given for a resetting manipulation. FIG. 13 shows a state in which a resetting manipulation has been performed. Pushing of the OK button 34 is referred to as a resetting manipulation. A color map 200m is an image adjustment window in which the saturation of yellow green (eleven o'clock) and yellow (zero o'clock) has been adjusted. In response to a resetting manipulation being performed, the levels of saturation of all hues return to the initial positions, and color marks M0 through M11 return to the position of the neutral line 222 (color map 200n). The saturation graph 240 coincides with the neutral line 222. Also, the control bar 230 moves to zero o'clock.

Also, in response to a resetting manipulation, color marks M0 through M11 may return to a prescribed preset line instead to the position of the neutral line 222. The preset line is a condition of saturation that is prepared in advance. Specifically, it is a condition etc. such as the setting of saturation that allows brilliant photography of sky with increased saturation around blue, the setting of saturation that allows brilliant photography of flowers with entirely increased saturation, and others. The preset line may be set by the manufacture as an initial value with a prescribed name or may be registered by the user as a favorite setting.

Explanations have been given for an example in which the front dial 20 is used as input means for specifying a hue. As described above, in the multicolor mode, only the saturation of an image having a specified hue is changed. In other words, the multicolor mode can also considered as image adjustment that changes saturation of a particular image. Accordingly, specifying an image that is actually being displayed is more direct as a manipulation. Hereinafter, explanations will be given for an example in which a hue for which the saturation is set is input directly through the image.

FIG. 14 shows an example of specifying a hue through the displayed image by using a touch panel 10a. On the left side of the window that displays a color map 200p, live view image LV, a reproduced image, etc. are displayed. Live view image LV etc. will be omitted in the figure. When a touch manipulation is performed on a subject for which it is desired that the saturation be changed, the manipulation input unit 130 identifies the touch position. The hue of the subject displayed at the identified touch position is detected and a hue close to the hue of the detected subject is selected from among for example hues of twelve colors. This will be explained in detail in FIG. 28.

The control bar 230 is moved to a hue close to the touched subject. It is assumed that a green subject is touched in the color map 200p. As shown as a color map 200q, the control bar 230 moves to ten o'clock. Thereafter, similarly to the above, the saturation is set through turning of the rear dial 24. Note that as shown in color map 200q, a cursor 260 may be displayed at the position that received a touch manipulation in the window so as to indicate the position of the touched subject.

Note that means for identifying a subject in live view image LV, a reproduced image, etc. is not limited to the touch panel 10a. It is also possible for example to identify a subject in the window through the XY direction button 33 so as to detect the hue of the identified subject. A hue close to the hue of the detected subject is selected from among hues of twelve colors.

Figure 15:
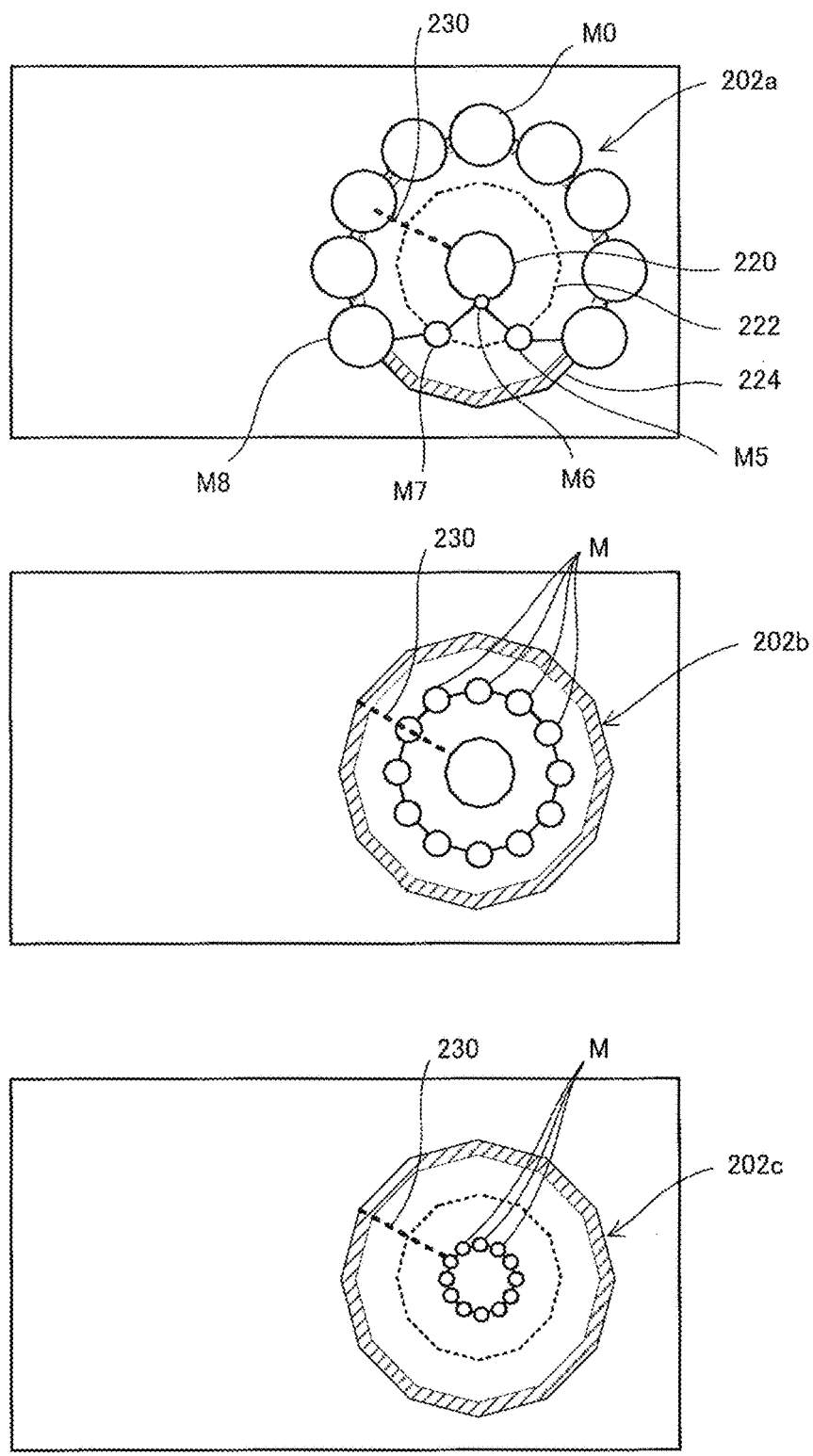
FIG. 15 explains an example in which color marks Mare changed in size in accordance with the saturation in the multicolor mode.

FIG. 15 shows an image adjustment window that changes the size of color marks M in accordance with the saturation. In the examples up to FIG. 14, the size of color marks M has been consistent regardless of the saturation. FIG. 15 explains an example in which color marks M are displayed in sizes in accordance with the saturation, i.e., sizes in accordance with the distances in a radial direction. This makes it possible to know whether the saturation is high or low not only from the position of color mark M in a radial direction but also from the size of color mark M.

As shown as the color map 202a, when color mark M is at the position of the upper limit frame 224, i.e., the saturation is at the upper limit, color mark M (including the point mark 250) is displayed in the maximum size. For example, color mark M0 and color mark M8 are in the maximum size.

Also, when color mark M is the neutral line 222, i.e., when the saturation is an initial value, an intermediate size is selected for the size of color mark M. In the color map 202a, color marks M5 and M7 are in an intermediate size. When color mark M is at the position of the lower limit frame 220, i.e., when the saturation is at the lower limit, the minimum size is selected for color mark M. In the color map 202a, color mark M6 is in the maximum size.

Also, as shown in the color map 202a and the color map 202c, the sizes of color marks M are selected in such a manner that no overlapping between different color marks M will occur in any positions between the upper and lower limit.

While FIG. 15 shows a window example by individual selection, it can also be applied to overall selection. According to the multicolor mode described above, it is possible to change the saturation of a desired hue alone without changing the saturation of other hues, permitting hue color creation.

Also, in the multicolor mode, the color map 200 of two-dimensional coordinate as an image adjustment window is displayed in which a hue is made to correspond to the angular direction and the saturation of each hue is made to correspond to the direction in a radial direction. In the multicolor mode, this color map specifies a hue and sets the saturation of that hue. This makes it possible for even inexperienced users to adjust intuitively the saturation of a desired hue. Also, the color map 200 displays the polygonal saturation graph 240, thereby making it possible to recognize the balance of saturation of each hue at a glance from the shape of this saturation graph 240.

Also, in the multicolor mode, a hue and saturation are set by turning of two dials, respectively, making it easy to perform manipulations while looking in the electronic view finder 12.

Also, in the multicolor mode, overall selection is provided in addition to individual selection, making it possible to change the saturation of the entire hues collectively in addition to change the saturation of a particular hue. This makes it possible to perform adjustment in which the saturation of a particular hue is increasing or decreased after the saturation of the entire image is first set at an appropriate position in the overall selection.

Also, it is made possible to select switching to overall selection in accordance with the usage environment by preparing the button approach and the dial approach. Using the dial approach, it is easy to perform a switch manipulation while looking in the electronic view finder 12. Also, because the sizes of color marks are in accordance with the levels of the saturation (distances in a radial direction), the level of saturation is displayed by the size of the color mark as well. Because the size of a color mark corresponds to the level of the saturation, it is possible to prevent the user from mistaking the direction of manipulations.

<Picture Mode>

Explanations have above been given for an image adjustment process in the multicolor mode in the picture mode. Hereinafter, explanations will be given for comparison between the multicolor mode, the monochrome creator mode and the color creator mode.

Note that the image adjustment windows of the multicolor mode, the monochrome creator mode and the color creator mode are referred to as the first through third image adjustment windows. Also, the color map generation unit 112, the color disk generation unit 114 and the monochrome disk generation unit 116 are referred to as the first through third display control units.

Figure 16:
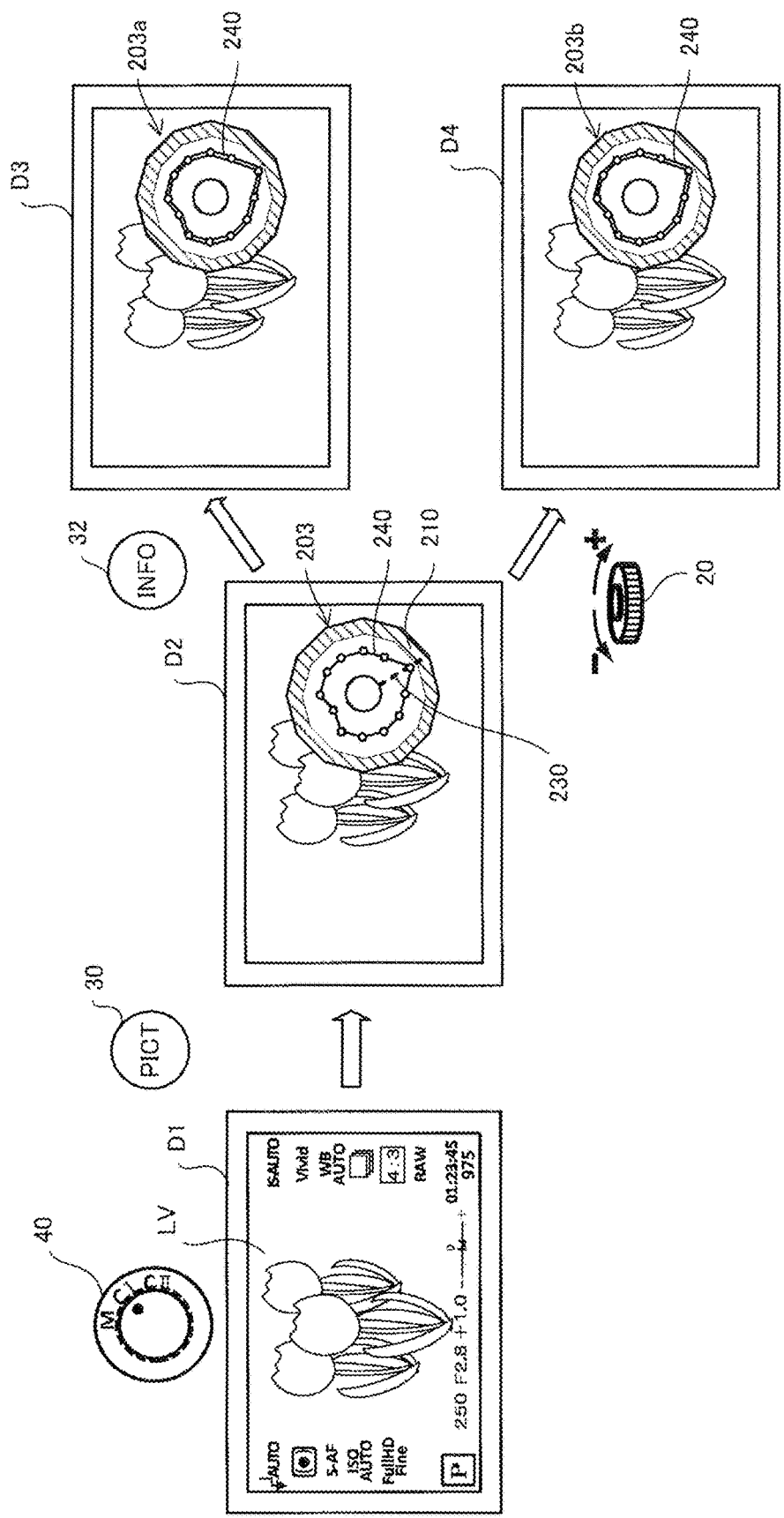
FIG. 16 explains the procedures of image adjustment in the multicolor mode.

FIG. 16 explains the procedures of image adjustment in the multicolor mode. The color map 200 in the multicolor mode has already been explained, and thus the explanations thereof will be omitted. Window D1 in the display unit 90 is a window of live view image LV that is displayed normally in the image capturing mode. When the PICT button 30 is pushed with the picture mode dial 40 set at CI, which is the position of the multicolor mode, in this window, the multicolor mode is set.

On the right of live view image LV, the color map 200 is displayed in a superimposed manner. As the color map 203, the control bar 230, the hue ring 210 and the saturation graph 240 are displayed. Note that window D2 is a window of individual selection.

When the INFO button 32 is pushed in individual selection (window D2), it changes to overall selection (window D3). It is overall selection method 1 described above. In a color map 203a, the respective sides of the rear dial 24 are displayed in double lines so as to indicate the switching to overall selection.

When a manipulation is performed through the front dial 20 to move the control bar 230 from zero o'clock to eleven o'clock in individual selection (window D2), it becomes the state of overall selection (window D4). It is overall selection method 2 described above. Also in a color map 203b, the respective sides of the saturation graph 240 are displayed in double lines so as to indicate the switching to overall selection.

As described above, the color map generation unit 112 (first display control unit) generates the color map 200 (first image adjustment window) for adjusting the saturation of a hue specified in the image. The first image adjustment window is a window for specifying a hue and setting the saturation of the specified hue on the two-dimensional coordinates in which a hue is made to correspond to the angular direction and the saturation of each hue is made to correspond to the distance in a radial direction.

Figure 17:
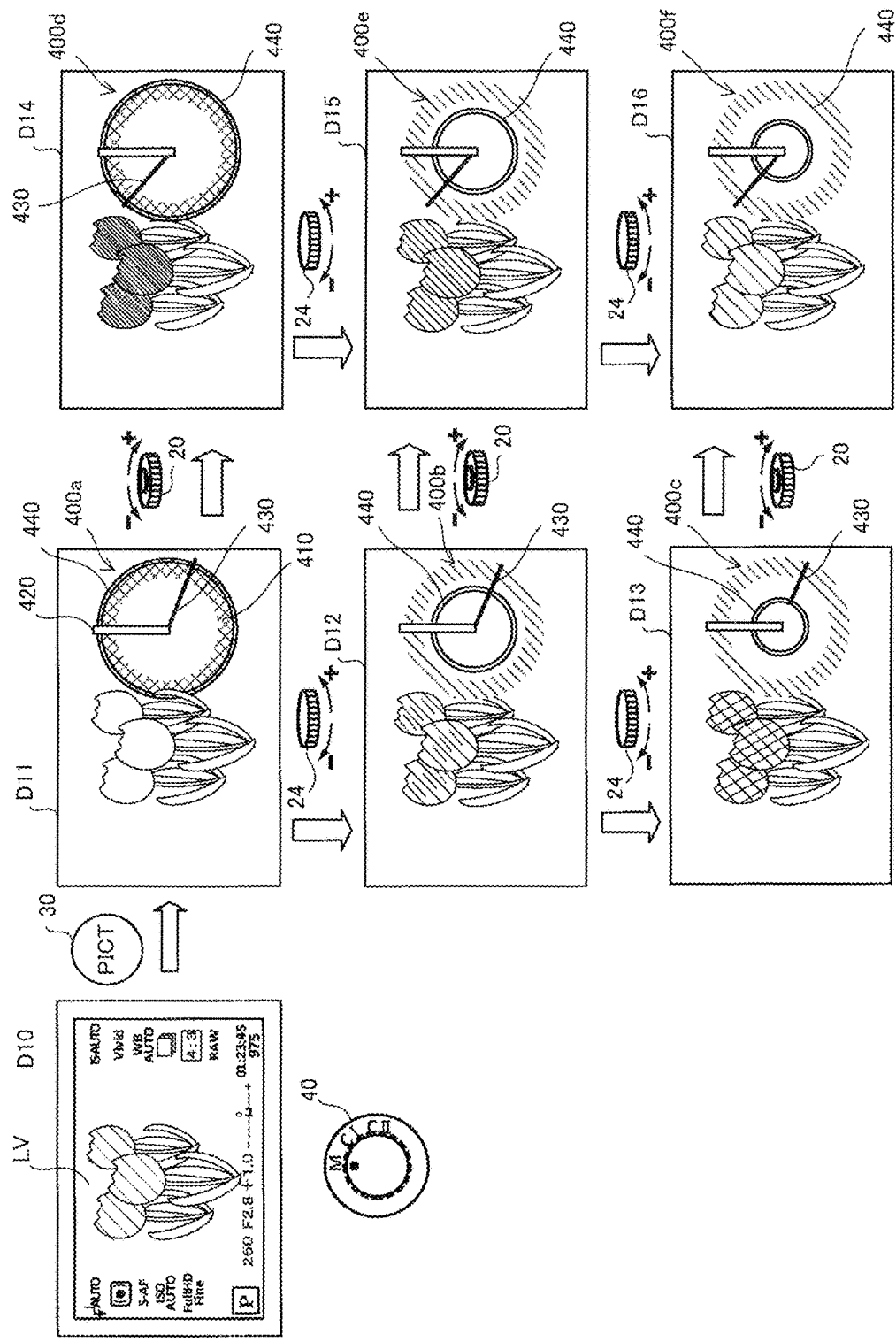
FIG. 17 explains the procedures of image adjustment in the monochrome creator mode.

FIG. 17 explains image adjustment in the monochrome creator mode. The monochrome creator mode is a mode in which the same effects as those in a case where a color filter is attached to the lens unit 3 is realized by a digital image process. An example of the effects by a color filter will be described. For example, when a red filter is attached to the lens unit 3, because light with a wavelength around red is transmitted by the filter while the other wavelengths are absorbed by the filter, a monochrome image on which a red color is emphasized strongly can be obtained.

In other words, when a red filter is attached, because the luminance of red is high and the luminance of complementary colors (blue green) is suppressed, red portions become brighter (whiter) and portions in complementary colors (blue green) become darker (blacker) in a monochrome image. In the monochrome creator mode, an image as described above is generated by an image process in accordance with an instruction from the user.

The monochrome creator mode is a process of shifting the color balance of the image to a specified filter color so as to convert the image into a monochrome image, the conversion-target image having been weighted with respect to the balance based on a set filter intensity. Accordingly, in the monochrome creator mode, not only a particular hue portion in an image but also the entire image is changed differently from the multicolor mode. It is similar to the color creator mode, which will be described later.

Window D10 is a normal window in which live view image LV is displayed in color. When the PICT button 30 is pushed with the picture mode dial 40 set at M, which is the position of the monochrome mode, in window D10, the normal live view display changes to the monochrome creator mode.

In the monochrome creator mode, live view image LV is displayed in monochrome, and on the right of live view image LV, a monochrome disk 400a is displayed in a superposed manner (window D11). The monochrome disk 400a is an image adjustment window in the monochrome creator mode.

Figure 18:
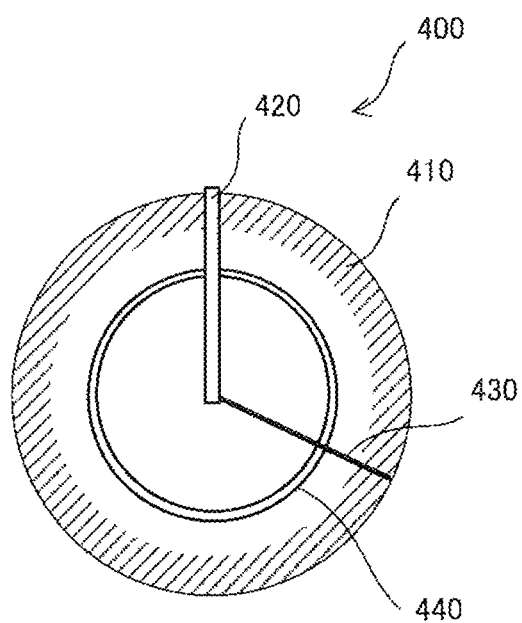
FIG. 18 is an enlarged view of a monochrome disk.

FIG. 18 is an enlarged view of the monochrome disk 400. In the monochrome disk 400, a filter color is specified by an angular direction and a filter intensity is set by a length in a radial direction. A hue and the saturation of the color map 200 correspond to the filter color and the filter intensity of the monochrome disk 400.

The monochrome disk 400 is provided with a hue ring 410, a neutral area 420, a control bar 430 and an intensity ring 440. The hue ring 410 is a scale for displaying the angular direction of a filter color. Similarly to the hue ring 210, for example hues of twelve colors are displayed in a shape of ring in the hue ring 410. While the hue ring 210 was polygonal in the color map 200, the hue ring 410 is displayed as a circle in the monochrome disk 400.

The neutral area 420 is an area for setting a state in which a color filter is not attached to the lens unit 3. The control bar 430 specifies a filter color by an angular direction and turns in accordance with turning of the front dial 20. The intensity ring 440 indicates the level of the filter intensity by the length of the diameter and the diameter changes in accordance with turning of the rear dial 24. In this example, the greater the diameter of the intensity ring 440 is, the higher the filter intensity is, and the smaller the diameter of the intensity ring 440 is, the lower the filter intensity is.

The monochrome disk 400a in window D11 is in a state with the control bar 430 in the direction of four o'clock and the intensity ring 440 having the maximum diameter. When the filter color in the direction of four o'clock is red purple, live view image LV is displayed after receiving an image process in which it is made to look as if a red purple filter were attached to the lens unit 3. The portion of red purple in the subject is displayed brightly to the maximum in a monochrome image. In window D11, when the flower in live view image LV is red purple, the flower portion is displayed with a luminance higher than window D10.

When the rear dial 24 is turned in the negative direction in the monochrome disk 400a in window D11, the diameter of the intensity ring 440 becomes smaller and the filter intensity is set to be lower as shown in a monochrome disk 400b in the window D12. In window D12, the flower portion in live view image LV is displayed darkly.

Also, when the rear dial 24 is further turned in the negative direction in the monochrome disk 400b in window D12, the diameter of the intensity ring 440 becomes smaller and the filter intensity is set to be lower as shown in a monochrome disk 400c in window D13. In window D13, the flower portion in live view image LV becomes darker than window D12.

When the front dial 20 is turned and the control bar 430 is moved to ten o'clock, it switches to window D14. Because "ten o'clock" is at the position that is 180 degrees from "four o'clock", the filter color at "ten o'clock" is changed to green, which is a complementary color of red purple. Because green, which is a complementary color of red purple is specified, the luminance of red purple decreases and the flower portion in live view image LV becomes darker than window D11 as shown in a monochrome disk 400d of window D14.

When the rear dial 24 is turned in the negative direction in window D14, the diameter of the intensity ring 440 becomes smaller and the filter intensity becomes lower as shown in a monochrome disk 400e of window D15. Because this decreases the luminance of red purple in window D15, the flower portion in live view image LV becomes brighter than window D14.

When the rear dial 24 is further turned in the negative direction in window D15, the filter intensity decreases as shown in a monochrome disk 400f in window D16. In window D16, this makes the flower portion in live view image LV further brighter than window D15.

Also, when the front dial 20 is turned in window D12, it shifts to window D15. Similarly, when the front dial 20 is turned in window D13, it shifts to window D16.

Note that because when the control bar 430 is at the position of zero o'clock, i.e., it is in the neutral area 420, a color filter is not attached to the lens, the intensity cannot be adjusted.

As described above, the monochrome disk generation unit 116 (second display control unit) generates the monochrome disk 400 (second image adjustment window). The picture mode dial 40 is a window for adjusting a monochrome coefficient in accordance with a filter color and filter intensity that are set, the monochrome coefficient being used for converting a color image into a monochrome image. The monochrome disk 400 is a window for setting a filter color and a filter intensity on a two-dimensional coordinate in which the filter color is made to correspond to the angular direction and the filter intensity is made to correspond to a distance in a radial direction.

As described above, in the monochrome creator mode, it is possible to obtain, without using an actual filter, images that are equivalent to ones obtained with a filter. By displaying the monochrome disk 400 as an image adjustment window, a filter color can be specified easily and a filter intensity can be set easily.

Figure 19:
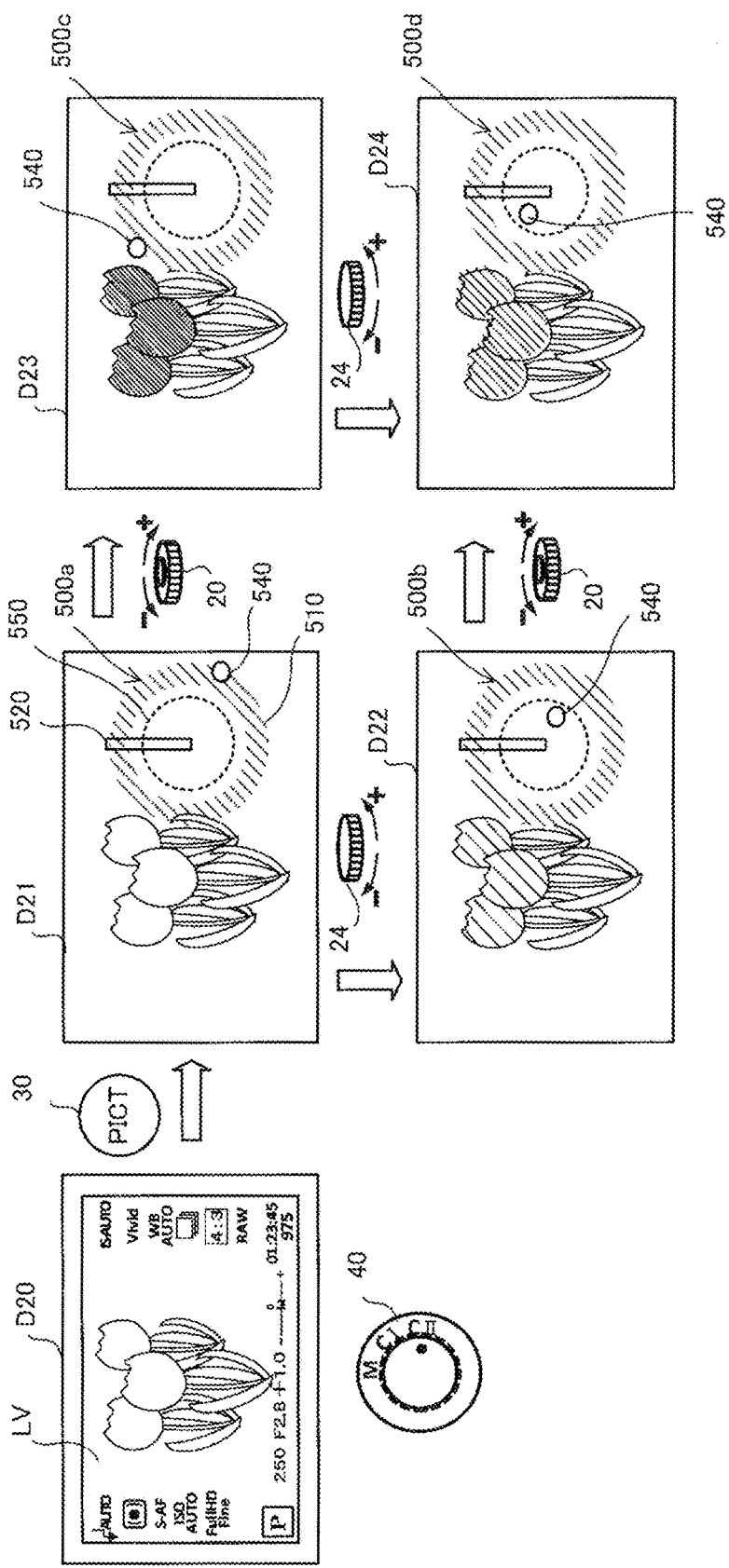
FIG. 19 explains image adjustment in the color creator mode.

FIG. 19 explains image adjustment based on the color creator mode. The color creator mode is a process in which the white balance is compensated to a specified hue and the saturation is adjusted to a set value in the image. In the color creator mode, a color disk 500 is displayed as an image adjustment window.

Window D20 is a usual window in which live view image LV is displayed. When the PICT button 30 is pushed with the picture mode dial 40 set at CII, which is the position of the color mode, in the window D20, the usual live view display is switched to the color creator mode.

In the color creator mode, a color disk 500a is displayed in a superposed manner (window D21) on the right of live view image LV.

Figure 20:
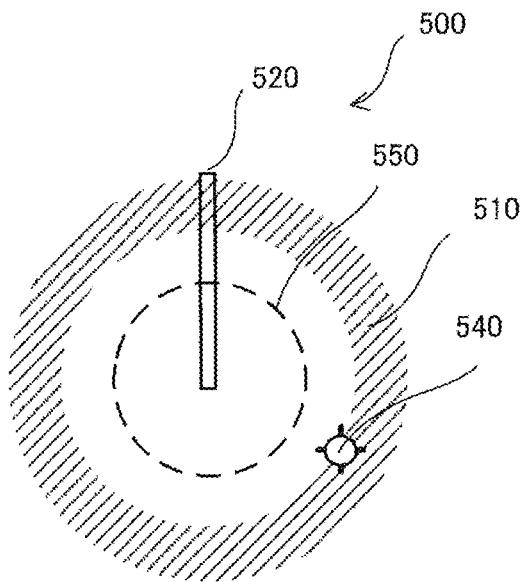
FIG. 20 is an enlarged view of a color disk.

FIG. 20 is an enlargement view of the color disk 500. Similarly to the color map 200, the color disk 500 as well indicates hues by angular directions and the levels of saturation by distances in in a radial direction.

The color disk 500 is provided with a hue ring 510, a neutral area 520, a cursor 540 and a neutral line 550.

The hue ring 510 is a scale for displaying the angular direction of a hue. Similarly to the hue ring 410 of the monochrome disk 400, the hue ring 510 has hues of for example twelve colors displayed in a shape of ring. The neutral area 520 as well is equivalent to the neutral area 420 of the monochrome disk 400. The cursor 540 specifies a hue and sets saturation. The cursor 540 has its angular direction changed in accordance with turning of the front dial 20, and has the diameter-directional position changed in accordance with turning of the rear dial 24. In this example, the outer the cursor 540 is positioned, the higher the saturation is and the inner the cursor 540 is positioned, the lower the saturation is.

Explanation returns to FIG. 19. In the color disk 500a of window D21, the cursor 540 has its angular direction at four o'clock and the diameter-directional position on the outermost periphery. Similarly to the example of FIG. 17, when four o'clock is red purple, an image process is performed so that the white balance receives emphasis compensation in the direction of red purple and the saturation becomes maximum. Live view image LV is displayed with high saturation and with emphasis on red.

It is assumed in window D21 that the rear dial 24 is turned in the negative direction. As shown in a color disk 500b in window D22, the cursor 540 is moved inwardly and the saturation is set to be low. Live view image LV is displayed with low saturation and with emphasis on red.

It is assumed in window D21 that the front dial 20 is turned and the cursor 540 is moved in the direction of 10 o'clock. As shown in a color disk 500c in window D23, when the direction of ten o'clock is green, the white balance receives emphasis compensation in the direction of green. Live view image LV is displayed with high saturation and with emphasis on green.

It is assumed in window D23 that the rear dial 24 is turned and the cursor 540 is moved inwardly in the direction of ten o'clock. As shown in a color disk 500d in window D24, the saturation is set to be low. Live view image LV is displayed with low saturation and with emphasis on green.

When the front dial 20 is turned and the cursor 540 is moved in the direction of ten o'clock in window D22, it shifts to window D24.

It is also assumed that the cursor 540 is set in the direction of zero o'clock and the cursor 540 is moved along the diameter direction of the neutral area 520 in response to turning of the rear dial 24. This makes it possible to adjust saturation alone without the white balance performing emphasis compensation on a particular hue.

By the color creator mode, it is possible to emphasis the entire image to a specified color tone and also to adjust the brilliantness.

As described above, the color disk generation unit 114 (third display control unit) generates the color disk 500 (third image adjustment window). The color disk 500 is a window for setting a hue for which the image color balance receives emphasis compensation and for setting the saturation of the entire image for which the color balance receives emphasis compensation in order to give an instruction to perform color adjustment for the entire image. The color disk 500 is a window in which the cursor is moved on the two-dimensional coordinates in which a hue is made to correspond to the angular direction and saturation is made to correspond to a distance in a radial direction so as to set a hue and saturation.

Explanations have been given for a case in which "hue and saturation" and "filter color and filter intensity" are manipulated through "front dial 20 and rear dial 24" in the picture mode, however, the invention is not limited to this. For example, a manipulation ring provided to the lens barrel may be used as manipulation means instead of "front dial 20 and rear dial 24".

As described above, in the picture mode, three types of image adjustment windows for the respective adjustment methods are prepared, making it possible for inexperienced users to capture satisfactory images.

<Controller Process in Picture Mode>

Next a control process in the picture mode will be explained. The following process is performed mainly by the camera control unit 100.

FIG. 21 is a flowchart for explaining procedures of the entire image capturing apparatus 1. It is assumed that the image capturing apparatus 1 is set to be in image capturing mode. The camera control unit 100 displays an image picked up by the image pickup unit 62 (live view image LV) on the back-surface monitor 10 or the electronic view finder 12 (step S10). The camera control unit 100 performs a UI (user interface) process (step S12) while displaying live view image LV.

Figure 22:
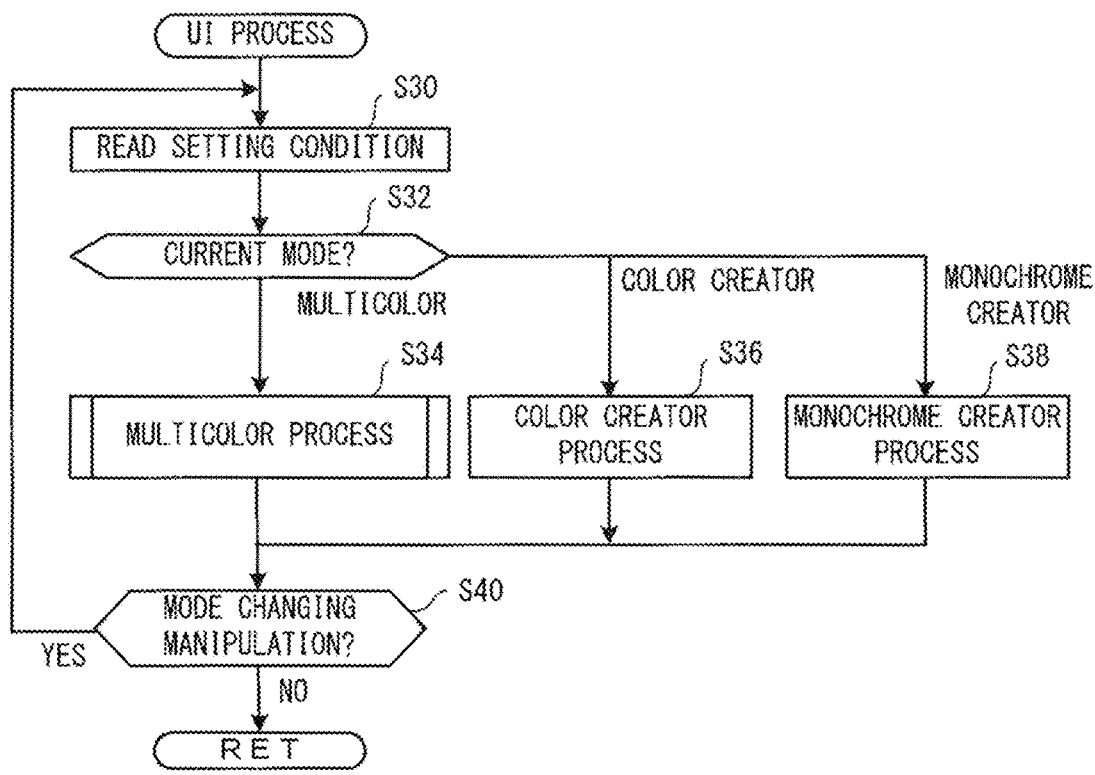
FIG. 22 is a subroutine showing the procedures of an UI process.

FIG. 22 is a subroutine showing the procedures of the UI (user interface) process. The UI process is performed mainly by the CPU 140 controlling the display control unit 110, the image process unit 120 and the manipulation input unit 130. The CPU 140 reads the setting condition for the picture mode that was executed last from the storage memory 82 (step S30). The CPU 140 selects a process on the basis of whether or not which mode is set as the current picture mode (step S32).

When it is switched to the picture mode from the usual live view window, the CPU 140 selects a mode in accordance with the position of the picture mode dial 40.

When the picture mode is the multicolor mode, the CPU 140 performs a multicolor process (step S34). When the picture mode is the color creator mode, the CPU 140 performs a color creator process (step S36). When the picture mode is the monochrome creator mode, the CPU 140 performs a monochrome creator process (step S38). Steps S34 through S38 will be described later in detail.

On the basis of a report from the manipulation input unit 130, the CPU 140 determines whether or not a mode changing manipulation was performed (step S40). Determining that a mode changing manipulation was performed (Yes in step S40), the CPU 140 returns to step S30. Determining that a mode changing manipulation was not performed (No in step S40), the CPU 140 proceeds to step S14 in FIG. 21.

Explanation returns to FIG. 21. On the basis of a report from the manipulation input unit 130, the CPU 140 determines whether or not a power-off manipulation was performed through pushing of the power button 26 (step S14). Determining that a power-off manipulation was not performed (No in step S14), the CPU 140 determines whether or not an image capturing manipulation was performed through pushing of the shutter button 22 (step S16).

Determining that an image capturing manipulation was performed (Yes in step S16), the CPU performs an image capturing process (step S18), and returns to step S10. Determining that an image capturing manipulation was not performed (No in step S16), the CPU 140 returns to step S10.

Determining that a power-off manipulation was performed (Yes in step S14), the CPU 140 perform a termination process (step S20) so as to terminate the process.

Figure 23:
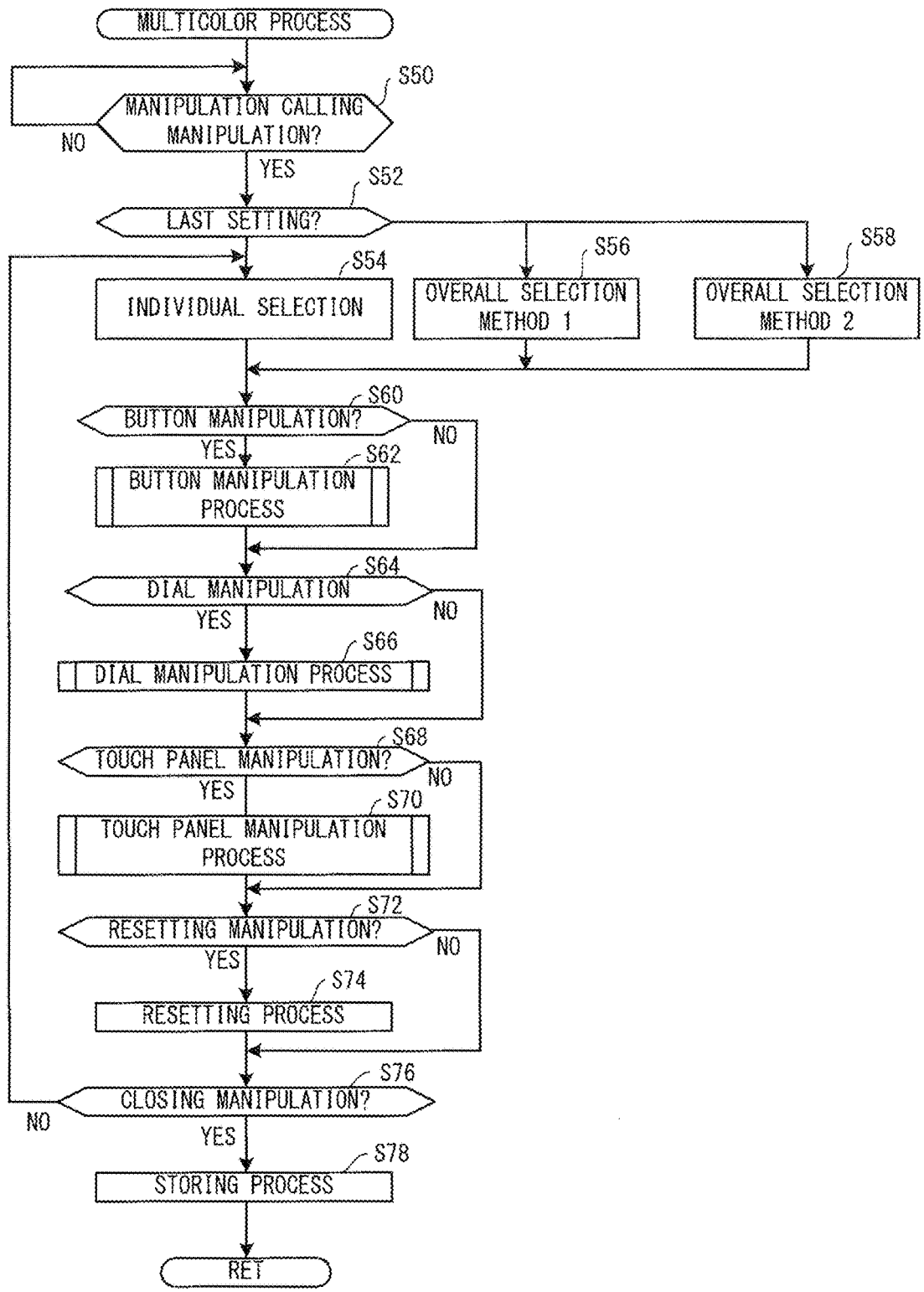
FIG. 23 is a subroutine showing the procedures of a multicolor process.

Returning to FIG. 22, the multicolor process in step S34 will be explained. FIG. 23 is a subroutine showing the procedures in the multicolor process.

In response to pushing of the PICT button 30, the CPU 140 determines whether or not a multicolor calling manipulation was performed (step S50). By the setting condition of the last picture mode read in step S30, the CPU 140 performs a process in accordance with the last setting (step S52).

When the last setting is individual selection, the CPU 140 displays the color map 200 of individual selection (image adjustment window) (step S54). Specifically, the color map 200 that was last displayed is displayed. For example, the CPU 140 displays the color map 200 shown in FIG. 6.

Also, when the last setting is overall selection method 1, the CPU 140 displays an image adjustment window based on overall selection method 1 such as the color map 200h shown in FIG. 9 (step S56). Specifically, the color map 200 based on the overall selection method 1 displayed last is displayed.

Also, when the last setting is overall selection method 2, the CPU 140 displays an image adjustment window based on overall selection method 2 such as the color map 200l shown in FIG. 11. Similarly to step S56, the color map 200 based on overall selection method 2 that was displayed last is displayed.

FIG. 24 shows relationships between individual selection, overall selection method 1 and overall selection method 2. As described above, individual selection and overall selection method 1 are switched through button manipulations. Individual selection and overall selection method 2 are switched through dial manipulations.

Next, the CPU 140 determines whether or not a button manipulation was performed (step S60). Determining that a button manipulation was performed (Yes in step S60), the CPU 140 performs a button manipulation process (step S62).

Figure 25:
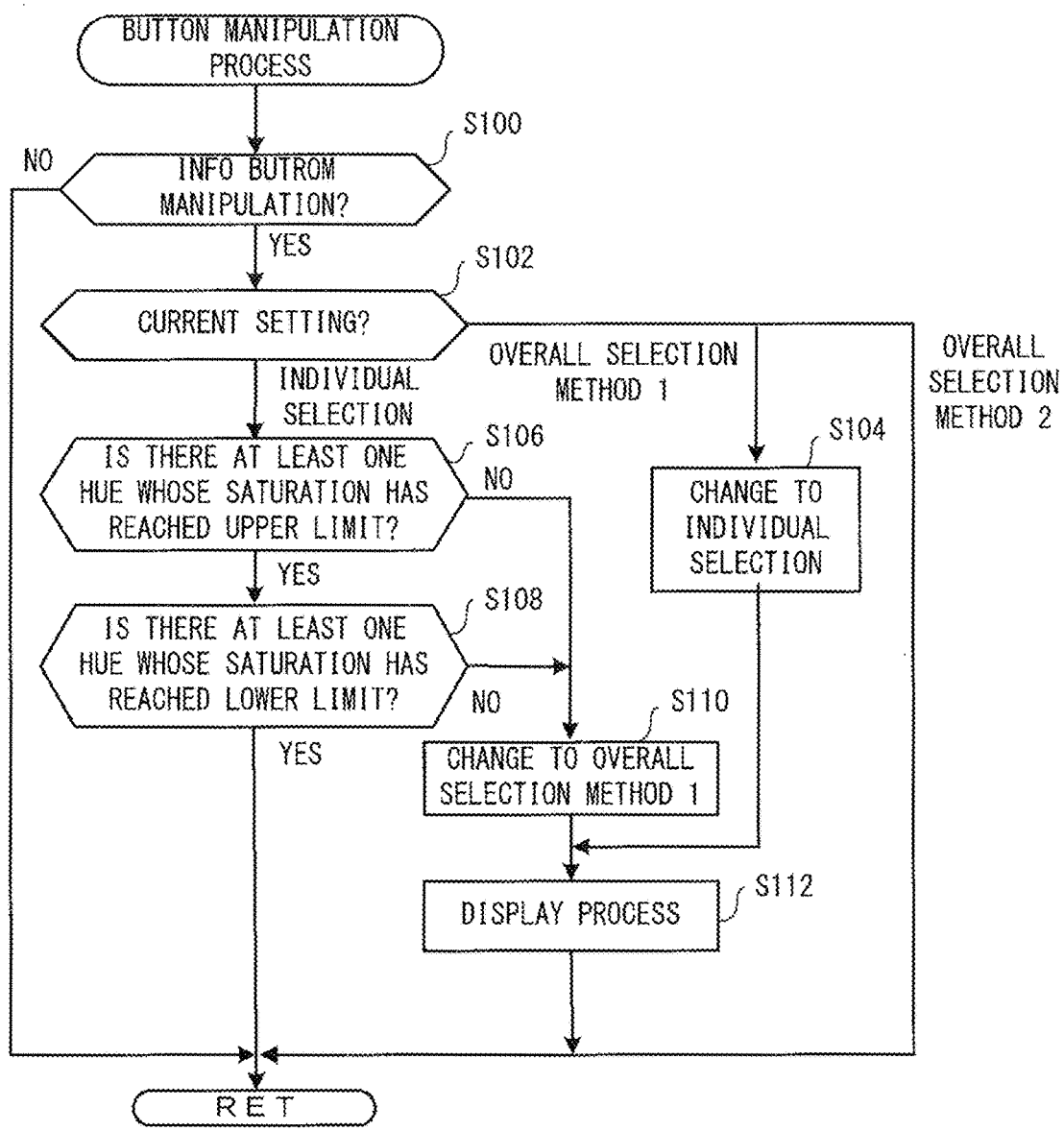
FIG. 25 is a subroutine showing the procedures of a button manipulation process.

FIG. 25 is a subroutine showing the procedures of the button manipulation process. Hereinafter, explanations will be given only for a process based on a manipulation on the INFO button 32 among button manipulations. Explanations for other button manipulations that are not related to the picture mode will be omitted.

The CPU 140 determines whether or not a manipulation on the INFO button 32 was performed (step S100). Determining that a manipulation on the INFO button 32 was performed (Yes in step S100), the CPU 140 performs a process in accordance with the current setting (step S102). Determining that a manipulation on the INFO button 32 was not performed (No in step S100), the CPU 140 proceeds to step S64 in FIG. 23.

When the current setting is overall selection method 2, the CPU 140 returns to step S64 in FIG. 23, ignoring the manipulation on the INFO button 32. When the current setting is overall selection method 1, the CPU 140 changes it to individual selection (step S104).

When the current setting is individual selection, the CPU 140 determines that there is at least one hue whose saturation has reached the upper limit (step S106). Determining that there is no hue whose saturation has reached the upper limit (No in step S106), the CPU 140 changes to overall selection method 1 (step S110), and proceeds to step S112.

Determining that there is at least one hue whose saturation has reached the upper limit (Yes in step S106), the CPU 140 determines whether or not there is at least one hue whose saturation has reached the lower limit (step S108). The CPU 108 determines that there is no hue whose saturation has reached the lower limit (No in step S108), and changes to overall selection method 1 (step S110).

The CPU 140 performs a display process in accordance with the change of the selection method (step S112). The CPU 140 instructs the display control unit 110 to change the color map 200. The color map generation unit 112 of the display control unit 110 generates the color map 200 in accordance with the change, and the display control unit 110 makes the display unit 90 display the generated color map 200. After step S112, the CPU 140 proceeds to step S64.

Determining that there is a hue whose saturation has reached the lower limit (Yes in S108), the CPU 140 returns to step S64 without changing to overall selection method 1. If there is saturation that has reached the upper limit and saturation that has reached the lower limit, it is because a method of changing levels of saturation collectively cannot be applied.

Explanation returns to FIG. 23. Determining that a button manipulation was not performed (No in step S60), the CPU 140 proceeds to step S64. The CPU 140 determines whether or not a dial manipulation was performed (step S64). Determining that a dial manipulation was performed (Yes in step S64), the CPU 140 performs a dial manipulation process (step S66). Determining that a dial manipulation was not performed (No in step S64), the CPU 140 proceeds to step S68.

Figure 26:
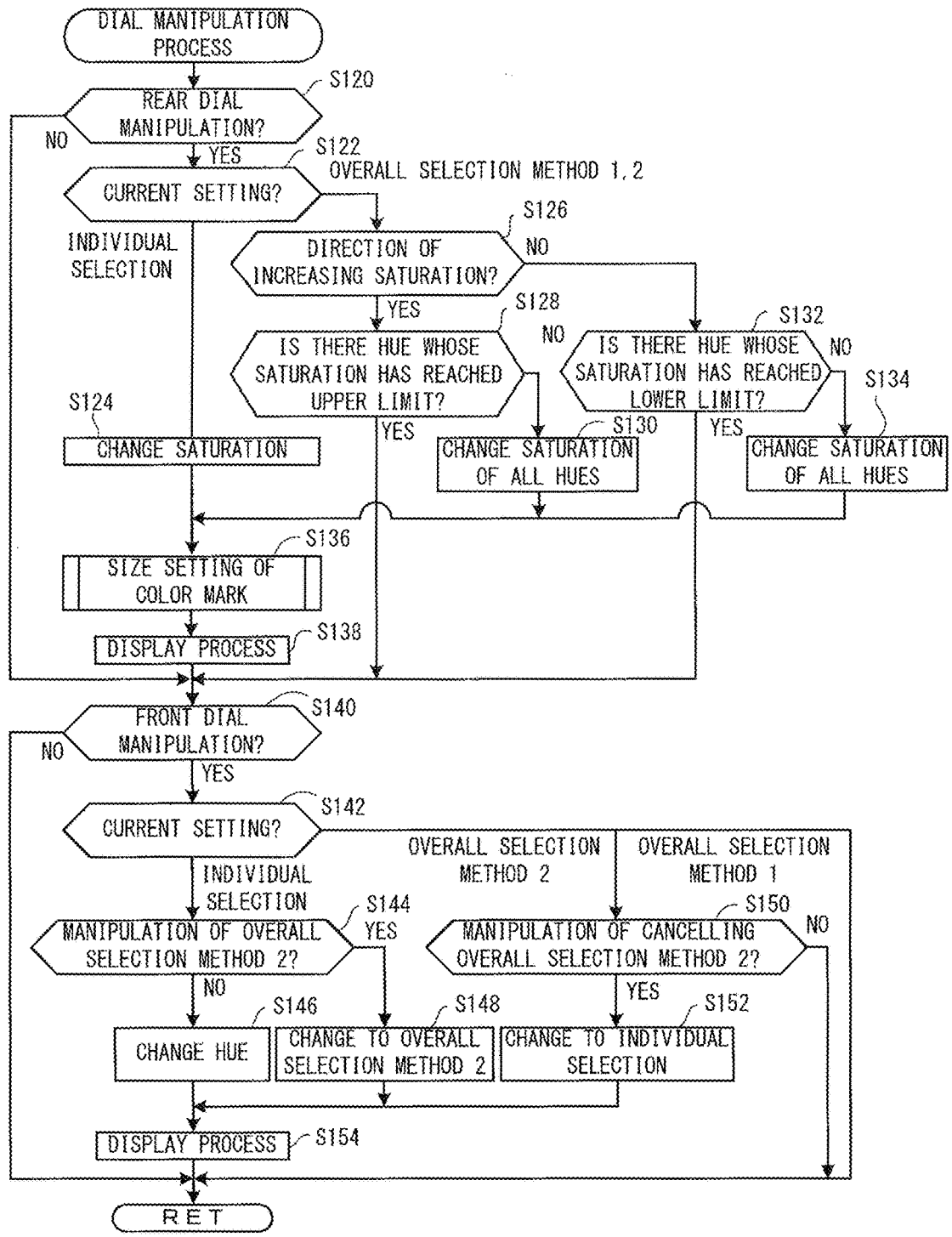
FIG. 26 is a subroutine showing the procedures of a dial manipulation process.

FIG. 26 is a subroutine showing the procedures of the dial manipulation process. The CPU 140 determines that the manipulation is a manipulation of the rear dial 24 (step S120). Determining that the manipulation is not a manipulation of the rear dial 24 (No in s120), the CPU 140 proceeds to step S140. Determining that the manipulation is a manipulation of the rear dial 24 (Yes in step S120), the CPU 140 selects a process in accordance with the current setting (step S122).

When the current setting is individual selection, the CPU 140 changes the saturation by a specified hue in accordance with the turning direction and turning angle of the rear dial 24 (step S124).

Also, when the current setting is overall selection methods 1 and 2, the CPU 140 determines whether or not the manipulation of the rear dial 24 is in the direction of increasing the saturation (step S126). Determining that the manipulation of the rear dial 24 is in the direction of increasing the saturation (Yes in step S126), the CPU 140 determines whether or not there is a hue whose saturation has reached the upper limit (step S128). Determining that there is a hue whose saturation has reached the upper limit (Yes in step S128), the CPU 140 invalidates the manipulation of the rear dial 24 and proceeds to step S140.

Determining that there is no hue whose saturation has reached the upper limit (No in step S128), the CPU 140 increases the levels of saturation of all hues in accordance with the turning angle (step S130), and proceeds to step S136.

Determining that the manipulation of the rear dial 24 is not in the direction of increasing the saturation (No in step S126), the CPU 140 determines whether or not there is a hue whose saturation has reached the lower limit (step S132). Determining that there is a hue whose saturation has reached the lower limit (Yes in step S132), the CPU 140 invalidates the manipulation of the rear dial 24, and proceeds to step S140.

Determining that there is no hue whose saturation has reached the lower limit (No in step S132), the CPU 140 decreases the levels of saturation of all hues in accordance with the turning angle (step S134), and proceeds to step S136.

Figure 27:
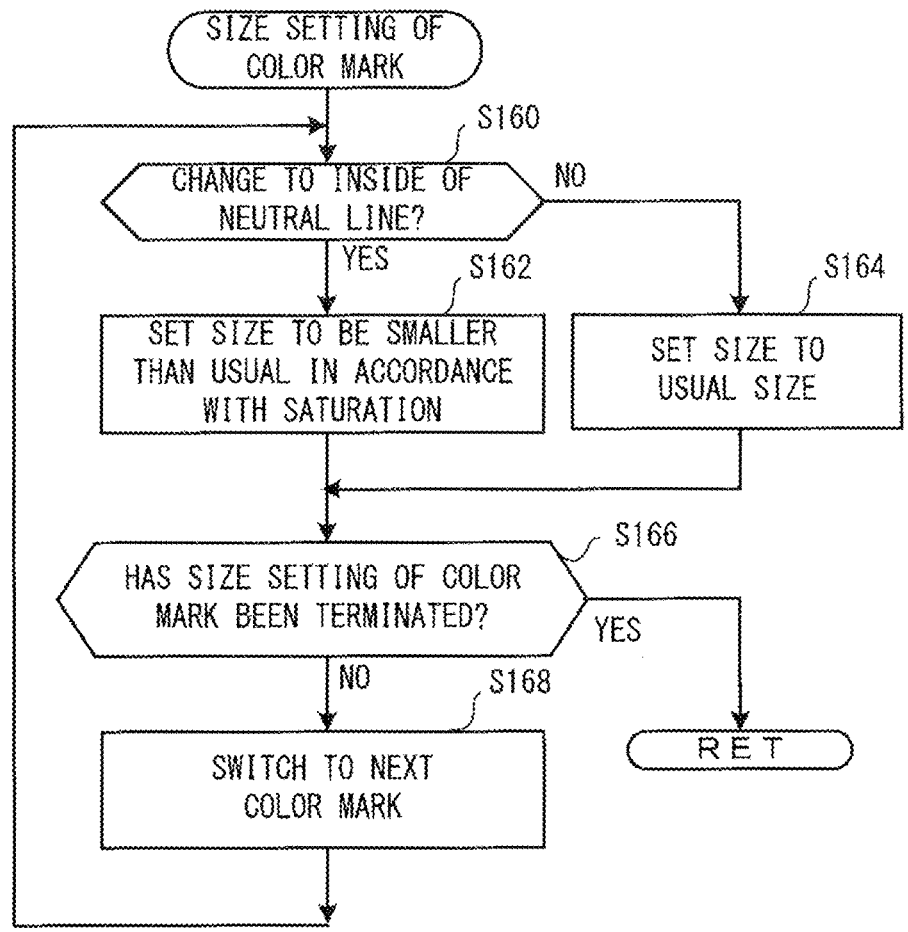
FIG. 27 is a subroutine showing the procedures of a size setting process of a color mark.

Then, the CPU 140 performs a size setting process of color marks (step S136). FIG. 27 is a subroutine showing the procedures of the size setting process of color marks. The color map generation unit 112 of the display control unit 110 changes the display sizes of color marks in accordance with the positions of color marks M in radial directions. FIG. 15 above showed an example in which a color mark was enlarged in size continuously in accordance with a distance in a radial direction, however FIG. 27 shows a process example in which the display size of color mark M is changed with reference to the neutral line 222. Note that color marks M hereinbelow may include the point mark 250.

The CPU 140 determines whether or not color mark M has been changed to the portion inside the neutral line 222, i.e., to a value lower than the initial value through the manipulation of the rear dial 24 in step S120 (step S160). Determining that color mark M has been changed to the portion inside the neutral line 222 (Yes in step S160), the CPU 140 sets the size of color mark M to a size smaller than usual in accordance with the saturation (step S162).

Determining that color mark M has not been changed to the portion inside the neutral line 222 (No in step S160), the CPU 140 sets the size of color mark M to a usual size (step S164).

CPU 140 determines whether or not size setting has been terminated for all color marks M of hues that were changed (step S166). It is a case where overall selection is set. In case of individual selection, step S166 is always yes. Determining that size setting has not been terminated for all color marks M of hues that were changed (No in step S166), CPU 140 switches to next color mark M (step S168), and returns to step S160. Determining that size setting has been terminated for all color marks M of hues that were changed (Yes in step S166), the CPU 140 proceeds to step S138 in FIG. 26.

After step S136, the CPU 140 gives an instruction of a display process corresponding to saturation changing (step S138). In response to an instruction from the CPU 140, the multicolor process unit 122 changes the saturation of a specified hue in an image process. Then, the multicolor process unit 122 generates live view image LV etc. by using the saturation changed for a specified hue. Also, the color map generation unit 112 generates the color map 200 corresponding to the change. The display control unit 110 displays the color map 200 corresponding to live view image LV for which the saturation has been changed.

The CPU 140 determines whether or not the manipulation is a manipulation of the front dial 20 (step S140). Determining that the manipulation is not a manipulation of the color map 200 (No in step S140), the CPU 140 proceeds to step S68 in FIG. 23.

Determining that the manipulation is a manipulation of the front dial 20 (Yes in step S140), the CPU 140 selects a process in accordance with the current setting (step S142). When the current setting is individual selection, the CPU 140 determines whether or not the manipulation content is a manipulation of overall selection method 2 (step S144). A manipulation of changing to overall selection method 2 is the manipulation explained in FIG. 11.

Determining that the manipulation content is not a manipulation of overall selection method 2 (No in step S144), the CPU 140 changes a hue in accordance with the manipulation direction and turning angle of the front dial 20 (step S146).

Determining that the manipulation content is a manipulation of overall selection method 2 (Yes in step S144), the CPU 140 changes the setting from individual selection to overall selection method 2 (step S148).

Also, when the current setting is overall selection method 2, the CPU 140 determines whether or not the manipulation content is a manipulation of cancelling overall selection (step S150). Determining that the manipulation content is a manipulation of cancelling overall selection (Yes in step S150), the CPU 140 changes the setting from overall selection method 2 to individual selection (step S152).

After steps 146, 148 and 152, the CPU 140 performs a display process corresponding to a change of a hue etc. (step S154). The display process is equivalent to step S138, and thus the explanation thereof will be omitted. In response to an instruction from the CPU 140, the color map generation unit 112 generates the color map 200 for which a specified hue has been changed or the color map 200 for which individual selection and overall selection have been switched.

Determining that the manipulation content is not a manipulation of cancelling overall selection method 2 (No in step S150), the CPU 140 returns to step S68 in FIG. 23. When the current setting is overall selection method 1 as well, the CPU 140 invalidates a manipulation of the front dial 20 and proceeds to step S68 in FIG. 23.

Explanation returns to FIG. 23. The CPU 140 determines whether or not a touch panel manipulation has been performed (step S68). Determining that a touch panel manipulation has not been performed (No in step S68), the CPU 140 proceeds to step S72. Determining that a touch panel manipulation has been performed (Yes in step S68), the CPU 140 performs a touch panel manipulation (step S70).

Figure 28:
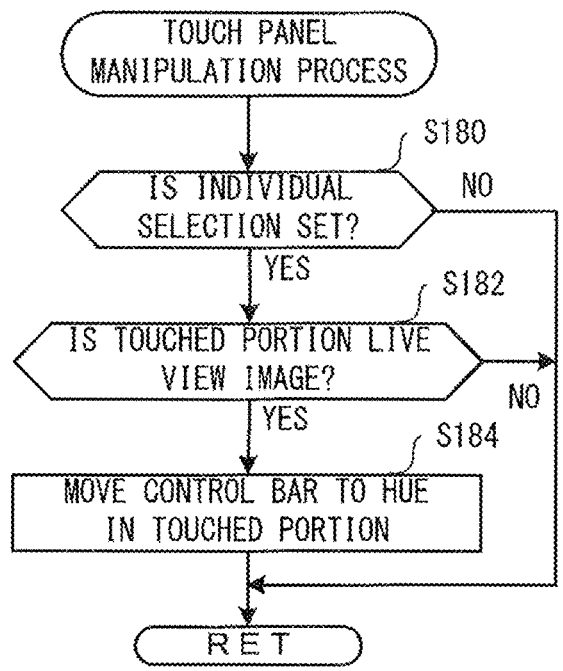
FIG. 28 is a subroutine showing the procedures of a touch panel manipulation process.

FIG. 28 is a subroutine showing the procedures of the touch panel manipulation process. It is a process of the manipulation explained in FIG. 14. The CPU 140 determines whether or not individual selection has been set (step S180). The specifying of a hue through a touch panel manipulation is validated only in individual selection.

Determining that individual selection has been set (Yes in step S180), the CPU 140 determines whether or not the touched portion is live view image LV (step S182). Determining that the touched portion is live view image LV (Yes in step S182), the CPU 140 extracts the image of the touched portion so as to identify the hue of the touched portion. The multicolor process unit 122 selects the hue closest to the identified hue of the touched portion from among the hues of twelve colors of the color map 200.

The CPU 140 gives an instruction that the control bar 230 should be moved to the hue of the touched portion (step S184). The color map generation unit 112 generates the color map 200 for which the control bar 230 has been moved in the angular direction corresponding to the hue selected by the multicolor process unit 122.

After the process in step S184, the CPU 140 returns to FIG. 23. Determining that individual selection has not been set (No in step S180) or that the touched portion is not live view image LV (No in step S182), the CPU 140 proceeds to step S72 in FIG. 23.

The CPU 140 determines whether or not a resetting manipulation has been performed through pushing of the OK button 34 (step S72). Determining that a resetting manipulation has been performed (Yes in step S72), the CPU 140 performs a resetting process of returning the levels of saturation of all colors to the initial values (step S74). As explained in FIG. 13, the color map 200 in which the levels of saturation of all hues have returned to the neutral line 222 and the control bar 230 also has returned to zero o'clock is displayed. Determining that a resetting manipulation has not been performed (No in step S72), the CPU proceed to step S76.

The CPU 140 determines whether or not a manipulation of closing the multicolor mode has been performed (step S76). A manipulation of closing the multicolor mode is pushing of the PICT button 30 for example. Determining that a manipulation of closing the multicolor mode has not been performed (No in step S76), the CPU 140 returns to step S54.

Determining that a manipulation of closing the multicolor mode has been performed (Yes in step S76), the CPU 140 stores the last setting condition of the multicolor mode, the position of the control bar 230, etc. in the storage memory 82 (step S78), terminates the multicolor mode, and returns to step S40 in FIG. 22.

<Image Process in Picture Mode>

Next, explanations will be given for image processes of the multicolor mode, the monochrome creator mode and the color creator mode.

Figure 29:
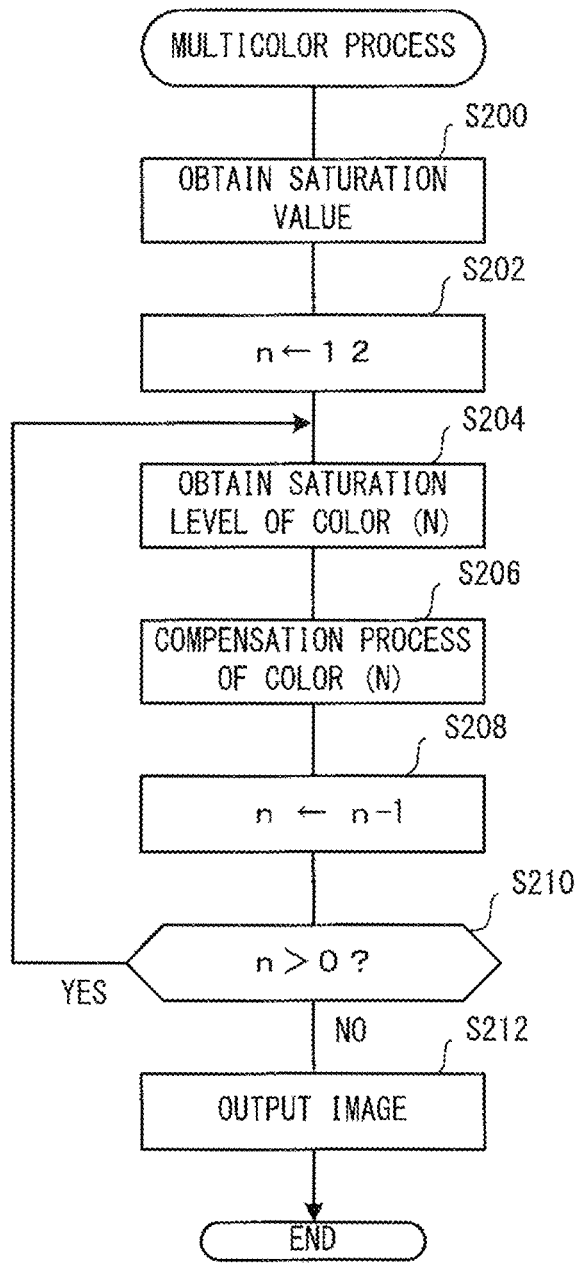
FIG. 29 is a flowchart showing the procedures of a multicolor process.

FIG. 29 is a flowchart showing the procedures of the multicolor process of the multicolor mode. The multicolor process unit 122 of the image process unit 120 performs a multicolor process below mainly. By using the multicolor mode, the user can adjust the saturation of each color individually so as to create colors freely.

The multicolor process unit 122 obtains the saturation value of each hue from the storage memory 82 (step S200). A saturation value of each hue is for example a value set in the last multicolor mode or an initial value (default value) stored in the storage memory 82 when it is not set.

The multicolor process unit 122 sets "12" in counter n that corresponds to each hue (step S202). "n" is the number of the hues that can be selected in the color map 200, and is in this example assumed to be twelve similarly to that in FIG. 5.

It is assumed that a prescribed setting was performed in the color map 200. The multicolor process unit 122 obtains a saturation level of COLOR (n) set in the color map 200 (step S204). COLOR (n) represents the n-th hue. For example, COLOR (12) is yellow green, which is the hue at eleven o'clock in FIG. 5. Also, when the saturation has eight steps as shown in the color map 200, the obtained saturation level is one of −3, −2, −1, 0, +1, +2, +3 and +4.

The multicolor process unit 122 performs a compensation process of the saturation value of COLOR (n) (step S206). By the saturation level of COLOR (n) obtained in step S204, the multicolor process unit 122 compensates the saturation value obtained in step S200.

The multicolor process unit 122 sets "n−1" in counter n (step S208). It is for switching the hue that receives compensation. The multicolor process unit 122 determines whether or not n>0 (step S210).

Determining that n>0 (Yes in step S210), the multicolor process unit 122 returns to step S204. The multicolor process unit 122 repeats it until the compensation for all colors is terminated. Determining that n>0 is not satisfied (No in step S210), the multicolor process unit 122 determines that the compensation for all colors has been terminated, generates an image by the saturation that received the compensation, and outputs the generated image (step S212).

Note that either of live view image LV and the reproduced image can be an image that is a target of the multicolor process. Also, live view image LV is always displayed while images are being captured and the color map 200 is displayed. Also, when image capturing is performed, live view image LV is converted into an image file as a captured image data, and is stored in the external memory 84.

Figure 30:
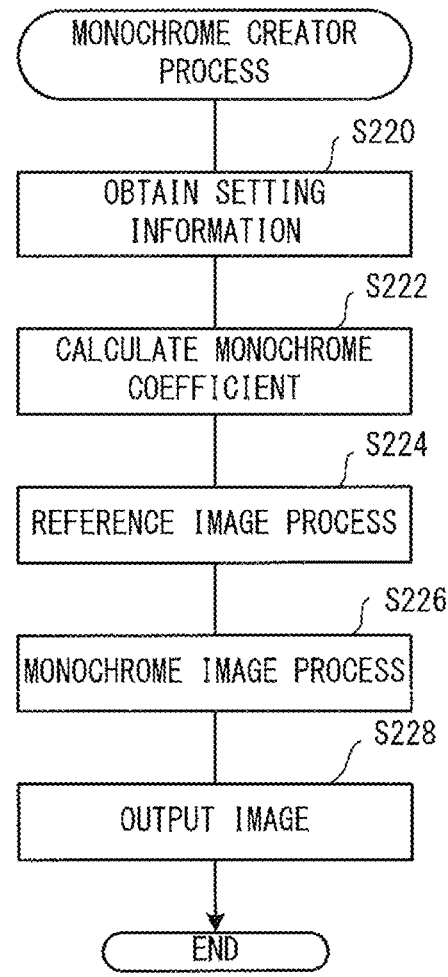
FIG. 30 is a flowchart showing the procedures of a monochrome creator process.

FIG. 30 is a flowchart showing the procedures of a monochrome creator process in the monochrome creator mode. As described above, the monochrome creator mode generates, through an image process, an image similar to that in a case when a color filter is attached to the lens unit 3. The monochrome creator process unit 126 of the image process unit 120 performs a monochrome creator process mainly.

The monochrome creator process unit 126 obtains information set in the monochrome disk 400 (step S220). The monochrome creator process unit 126 obtains information of the filter color and the filter intensity set in the monochrome disk 400. The set filter color is referred to as a selected color and a complementary color of the set filter color is referred to as a non-selected color.

The monochrome creator process unit 126 calculates a monochrome coefficient (also referred to as a monochrome conversion coefficient) (step S222). A monochrome coefficient is for converting a color image into a monochrome image. The monochrome creator process unit 126 determines a monochrome conversion coefficient from obtained setting information. Specifically, the monochrome creator process unit 126 performs weighting on a reference monochrome coefficient so that a selected color is emphasized and a non-selected color is suppressed, and thereby calculates a monochrome coefficient. The monochrome creator process unit 126 further changes weighting by the set filter intensity, and calculates a monochrome coefficient.

Also, the monochrome creator process unit 126 may obtain a coefficient that is predetermined for each piece of setting information such as a filter color, a filter intensity, etc. by referring to a table stored in the storage memory 82 so as to perform weighting on a reference monochrome coefficient by the obtained coefficient.

First, the monochrome creator process unit 126 generates color image data (reference image) that received WB (white balance) adjustment, from captured image data (step S224). The monochrome creator process unit 126 thereafter performs weighting computation on a color image data (reference image) in accordance with a monochrome coefficient so as to generate a monochrome image (step S226). The monochrome creator process unit 126 outputs a monochrome image (step S228).

Either of live view image LV and a reproduced image can be a target of a monochrome creator process. Also, live view image LV is always displayed while images are being captured and the monochrome disk 400 is displayed. Also, when image capturing is performed, live view image LV is converted into an image file as a captured image data, and is stored in the external memory 84.

FIG. 31 is a flowchart showing the procedures of the color creator process in the color creator mode. The color creator process unit 124 of the image process unit 120 performs the color creator process mainly. The color creator mode is a mode that can emphasize the entire image to a specified color tone and also adjust the brightness.

The color creator process unit 124 obtains information set in the color disk 500 (step S240). The color creator process unit 124 obtains information of the hue and saturation set in the color disk 500.

The color creator process unit 124 generates color image data (reference image) that received WB (white balance) adjustment, from captured image data (step S242).

The color creator process unit 124 performs a color tone compensation process (step S244). The color creator process unit 124 performs emphasis compensation on WB in the specified hue direction, but does not turn the hue. Also, the color creator process unit 124 increases and decreases the saturation in accordance with the set saturation. In other words, the color creator process unit 124 gives weight in a specified hue direction, and compensates the entire saturation in accordance with the set saturation.

The color creator process unit 124 generates an image having received a color tone compensation process so as to output it (step S246). Either of live view image LV and the reproduced image can be a target of a color creator process. Also, live view image LV is always displayed while images are being captured and the color map 500 is displayed. Also, when image capturing is performed, live view image LV is converted into an image file as a captured image data, and is stored in the external memory 84.

<Color Scale Display>

Explanations has been given for an example in which "hue and saturation" or "filter color and filter intensity" are represented by polar coordinates, however, two-dimensional expression is not limited to polar coordinates. FIG. 32 is a figure showing an image adjustment window in which "hue and saturation" is represented by rectangular coordinates of XY in the color creator mode. Window D30 in FIG. 32 is a window in which a color creator graph 600 is displayed on live view image LV (not shown) in a superimposed manner. An image adjustment window in this example is referred to as a color creator graph.

The color creator graph 600 includes a color palette 610 and a monochrome palette 620. The color palette 610 is equivalent to the color disk 500. The right and left directions of the color palette 610 correspond to hues, and the upper and lower directions correspond to the level of the saturation. The monochrome palette 620 is equivalent to the neutral area 520 explained in FIG. 20.

The color palette 610 is displayed in colors that sequentially correspond in the horizontal directions. For example, it is displayed in twelve colors of yellow, yellow orange, red orange, red, red purple, purple, blue purple, blue, blue containing green, blue green, green and yellow green (C0, . . . , C11) in the order from the left edge in the right direction. Note that hues may be displayed in such a manner that they change continuously instead of being divided by areas as in window D30.

Then, a cursor 630 that can move in the upper, lower, right and left directions is displayed on the color palette 610. A hue is set by a position of the cursor 630 in the horizontal directions, and the saturation is set by a vertical position of the cursor 630.

The monochrome palette 620 is an area for adjusting saturation only without changing the color balance of the subject. By the horizontal position of the cursor 630 on the monochrome palette 620, the saturation is set.

Also, while the moving of the cursor 630 may be performed by a combination of the front dial 20 and the rear dial 24 similarly to the above manner, it may be performed by the XY direction button 33.

Window D31 in FIG. 32 is a view that shows an image adjustment window in which a hue and saturation are represented by rectangular coordinates of XY in the multi-color mode. An image adjustment window in this example is referred to as a multicolor graph. In window D31, a multicolor graph 650 is displayed on live view image LV (not shown) in a superimposed manner. Similarly to the color palette 610, colors corresponding to hues sequentially in the horizontal directions (C0, . . . , C11) are displayed on the color palette 610. Note that hues may be displayed in such a manner that they change continuously instead of being divided by areas.

Also, in the multicolor graph 650, the horizontal directions are equivalent to the saturation. A marker 680 is displayed for the saturation set for each hue, and the markers 680 are connected by straight lines. Also, a neutral line 685 represented by a horizontal dashed line is a line representing the initial values of saturation (default values). The neutral line 685 is equivalent to the neutral line 222 explained in FIG. 4. By moving a cursor 670 in the right and left directions, a hue is specified, and by moving the cursor 670 in the upper and lower directions, saturation is set. The cursor 670 is displayed in a size larger than that of the marker 680.

Also, while a movement manipulation of the cursor 670 may be performed by the front dial 20 and the rear dial 24 similarly to the above, it may be performed by the XY direction button 33.

By the image adjustment window based on XY coordinates described above as well, the user can recognize manipulation procedures intuitively, and thus users without knowledge of image adjustment can easily perform manipulations.

<Effects by Embodiment>

It has conventionally been not easy for users not having knowledge of image adjustment to express favorite tints because image adjustment software executed based on a personal computer assumes that users have knowledge of image adjustment. Also, an image adjustment function embedded in a mobile device such as a camera etc. is required to have a manipulation window in which users not having knowledge of image adjustment can perform settings intuitively. The image adjusting apparatus explained above makes it easy even for users not having knowledge of image adjustment to perform color adjustment.

<Variation Example>

It is also possible to employ a configuration in which an image adjustment window such as the generated color map 200, the generated monochrome disk 400, etc. is registered as "favorite" so that a favorite condition for image adjustment can be called easily. Part or whole of a process executed by the CPU 140 that has read a control program may be changed to hardware process. In the above embodiment, the number of the hues that can be specified was twelve, it is just an example and the number of the hues is arbitrary. Explanations have been given for an example in which the image adjusting apparatus is applied to an image capturing apparatus, however it can also be applied to an image reproduction device and an information processing device (such as a personal computer (PC)). Explanations have been given for an example of selectively displaying three image adjustment windows of the color map 200, the monochrome disk 400 and the color disk 500, however the image adjusting apparatus may display one or two of the three image adjustment windows.

In addition, the present invention is not limited to the above-described embodiments as they are, but may be embodied by deforming constituents within a scope not deviating from the gist of the invention at an execution step. In addition, various inventions can be made by appropriately combining a plurality of constituents that have been disclosed in the above embodiments. For example, all the constituents that have been disclosed in the embodiments may be appropriately combined. Further, constituents in different embodiments may be appropriately combined. It should be understood that various modifications and applications can be made without departing from the scope and the spirit of the invention.

EXPLANATIONS OF LETTERS OR NUMERALS1 IMAGE CAPTURING APPARATUS

2 Main Body
3 Lens Unit
10 Back-Surface Monitor
12 Electronic View Finder
20 Front Dial
24 Rear Dial
30 PICT Button
32 Info Button
33 XY Direction Button
40 Picture Mode Dial
82 Storage Memory
90 Display Unit
100 Camera Control Unit
102 Image-Pickup Control Unit
110 Display Control Unit
112 Color Map Generation Unit
114 Color Disk Generation Unit
116 Monochrome Disk Generation Unit
120 Image Process Unit
122 Multicolor Process Unit
124 Color Creator Process Unit
126 Monochrome Creator Process Unit
130 Manipulation Input Unit
140 CPU
200 Color Map
210 Hue Ring
220 Lower Limit Frame
222 Neutral Line
224 Upper Limit Frame
230 Control Bar
232 Step-Number Mark
240 Saturation Graph
250 Point Mark
400 Monochrome Disk
410 Hue Ring
420 Neutral Area
430 Control Bar
440 Intensity Ring
500 Color Disk
510 Hue Ring
520 Neutral Area
540 Cursor
550 Neutral Line
600 Color Creator Graph
650 Multicolor Graph

What is claimed is:

1. An image adjusting apparatus that sets saturation of a specified hue for a target image, the image adjusting apparatus comprising:
    a display control unit that displays an image adjustment window in which saturation of a specified hue is set by a two-dimensional coordinate in which a hue is made to correspond to an angular direction and levels of saturation of respective hues are made to correspond to distances in a radial direction; and
    a control process unit that specifies the hue through first manipulation input, and sets saturation of the specified hue through second manipulation input, wherein
    the display control unit displays a polygon representing a relative relationship between levels of saturation of respective hues set by the control process unit in the image adjustment window.

2. The image adjusting apparatus according to claim 1, wherein
    the display control unit displays, in the image adjustment window, a control bar that moves in an angular direction so as to specify the hue in accordance with the first manipulation input and a mark that moves in a radial direction on the control bar so as to represent saturation that is set, in accordance with the second manipulation input.

3. The image adjusting apparatus according to claim 1, wherein
    the display control unit displays, on an outer periphery of the image adjustment window, a hue ring formed by the hues corresponding to the angular directions that are connected in a ring.

4. The image adjusting apparatus according to claim 1, wherein
    the display control unit displays upper and lower limits of the saturation that is set and an initial value of saturation in the image adjustment window.

5. The image adjusting apparatus according to claim 1, wherein
    the control process unit treats a turning manipulation of a first dial as the first manipulation input and treats a turning manipulation of a second dial as the second manipulation input.

6. The image adjusting apparatus according to claim 1, wherein
    the control process unit sets, through a prescribed manipulation, overall selection that specifies all hues as the hues that are specified, and
    when the overall selection is set, the control process unit collectively sets levels of saturation of all hues through the second manipulation input.

7. The image adjusting apparatus according to claim 6, wherein
    the display control unit displays, in the image adjustment window, a control bar that moves in an angular direction so as to specify the hue in accordance with the first manipulation input, and
    the controller process treats a manipulation of moving the control bar in a predetermined angular direction as the prescribed manipulation.

8. The image adjusting apparatus according to claim 6, wherein
    even when the prescribed manipulation is performed, the control process unit refrains from setting the overall selection in a case when a hue whose saturation has reached an upper limit of setting and a hue whose saturation has reached a lower limit of setting respectively exit in the image adjustment window.

9. The image adjusting apparatus according to claim 6, wherein
when saturation of at least one hue has reached an upper limit of setting through the second manipulation input, the control process unit invalidates a setting of further increasing the saturation through the second manipulation input or when saturation of at least one hue has reached a lower limit of setting through the second manipulation input, the control process unit invalidates a setting of further decreasing the saturation through the second manipulation input, in a case when the overall selection is selected.

10. The image adjusting apparatus according to claim 1, wherein
the display control unit returns levels of saturation of all hues to initial values when a prescribed manipulation is performed.

11. The image adjusting apparatus according to claim 10, wherein
the display control unit displays a control bar that moves in an angular direction so as to specify the hue in accordance with the first manipulation input in the image adjustment window, and further returns the control bar to an initial position when the prescribed manipulation is performed.

12. The image adjusting apparatus according to claim 1, wherein
the display control unit displays the image adjustment window in a manner that the image adjustment window is superimposed on a live view image.

13. The image adjusting apparatus according to claim 1, wherein
when an image is identified by a touch panel provided in a display unit, the control process unit treats a hue of the identified image as a hue specified through the first manipulation input.

14. The image adjusting apparatus according to claim 1, comprising:
an image process unit that performs a process of changing saturation of an image having a hue specified in the image adjustment window to saturation that was set, and generates an image.

15. An image adjusting method that sets saturation of a specified hue for a target image, the image adjusting method comprising:
displaying an image adjustment window in which saturation of a specified hue is set by a two-dimensional coordinate in which a hue is made to correspond to an angular direction and levels of saturation of respective hues are made to correspond to distances in a radial direction;
specifying the hue through first manipulation input and setting saturation of the specified hue through second manipulation input, and
displaying a polygon representing a relative relationship between levels of set saturation of respective hues in the image adjustment window.

16. An image adjusting apparatus that gives an instruction of color adjustment of an image, the image adjusting apparatus comprising:
a first display control unit that generates a first image adjustment window, which is an image adjustment window that adjusts saturation of a hue specified in an image and that sets a hue to be adjusted and saturation respectively on a two-dimensional coordinate in which a hue is made to correspond to an angular direction and levels of saturation of respective hues are made to correspond to distances in a radial direction;
a second display control unit that generates a second image adjustment window, which is an image adjustment window that adjusts a monochrome coefficient for converting a color image into a monochrome image in accordance with a set filter color and a set filter intensity and that sets the filter color and the filter intensity respectively on a two-dimensional coordinate in which the filter color is made to correspond to an angular direction and the filter intensity is made to correspond to a distance in a radial direction; and
a third display control unit that generates a third image adjustment window, which is an image adjustment window that respectively sets a hue for performing emphasis compensation on a color balance of an image and saturation of an entire image for which the color balance receives emphasis compensation, gives an instruction of color adjustment of an entire image and sets the hue and saturation on a two-dimensional coordinate in which the hue is made to correspond to an angular direction and the saturation is made to correspond to a distance in a radial direction.

17. The image adjusting apparatus according to claim 16, wherein
the first display control unit displays a control bar that includes an array of marks representing setting positions of levels of saturation and that turns so as to specify the hue in the first image adjustment window.

18. The image adjusting apparatus according to claim 16, wherein
the first display control unit displays a polygon that represents a relative relationship between levels of saturation of the hues in the first image adjustment window.

19. The image adjusting apparatus according to claim 16, wherein
the second display control unit displays a control bar that turns and sets the filter color by an angular direction and a ring that represents the filter intensity by a size of a diameter.

20. The image adjusting apparatus according to claim 16, wherein
the third display control unit displays a cursor that represents a hue by an angular direction and represents saturation by a position in a radial direction in the third image adjustment window.

* * * * *